US012694287B2

(12) United States Patent
Cirillo et al.

(10) Patent No.: US 12,694,287 B2
(45) Date of Patent: Jul. 28, 2026

(54) PRIVACY-PRESERVING FEDERATED MACHINE LEARNING

(71) Applicant: NEC Laboratories Europe GmbH, Heidelberg (DE)

(72) Inventors: Flavio Cirillo, Heidelberg (DE); Gurkan Solmaz, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 1136 days.

(21) Appl. No.: 17/723,503

(22) Filed: Apr. 19, 2022

(65) Prior Publication Data

US 2023/0237321 A1    Jul. 27, 2023

Related U.S. Application Data

(60) Provisional application No. 63/303,528, filed on Jan. 27, 2022.

(51) Int. Cl.
*G06N 3/08*          (2023.01)
*G06F 18/214*      (2023.01)
        (Continued)

(52) U.S. Cl.
CPC ............. *G06N 3/08* (2013.01); *G06F 18/214* (2023.01); *G06F 18/22* (2023.01); *G06F 21/6245* (2013.01); *G06N 3/045* (2023.01)

(58) Field of Classification Search
CPC ........ G06N 3/08; G06N 3/045; G06N 3/0464; G06N 3/0475; G06N 3/098; G06N 3/0895;
        (Continued)

(56) References Cited

U.S. PATENT DOCUMENTS

2015/0234694 A1*    8/2015    Chow .................. H04L 41/064
                                                              714/47.3
2021/0117780 A1      4/2021    Malik et al.
                (Continued)

FOREIGN PATENT DOCUMENTS

CN            113657611 A      11/2021
CN            113705712 A      11/2021
WO      WO 2021/249662 A1    12/2021

OTHER PUBLICATIONS

Dax, "Imputing Missing Entries of a Data Matrix: A review", Nov. 2014 (Year: 2014).*
                (Continued)

*Primary Examiner* — Reji Kartholy
(74) *Attorney, Agent, or Firm* — Leydig, Voit & Mayer, Ltd.

(57)                ABSTRACT

A method preserving privacy in federated machine learning system is provided. In the method, a first computing entity in the federated learning system determines a first labeling matrix based on applying a first set of labeling functions to first data points. The first labeling matrix includes a plurality of first labels. The first computing entity obtains a similarity matrix indicating similarity scores between the first data points and second data points associated with a second computing entity. The first computing entity augments the first labeling matrix by transferring labels from a second labeling matrix into the first labeling matrix using the similarity scores between the first data points and the second data points. The first computing entity trains a discriminative machine learning model associated with the first computing entity based on the first augmented labeling matrix.

17 Claims, 9 Drawing Sheets

(51) Int. Cl.
*G06F 18/22* (2023.01)
*G06F 21/62* (2013.01)
*G06N 3/045* (2023.01)

(58) Field of Classification Search
CPC .... G06F 18/214; G06F 18/22; G06F 21/6245; G06F 21/6254

See application file for complete search history.

(56) References Cited

U.S. PATENT DOCUMENTS

| | | | |
|---|---|---|---|
| 2021/0326757 A1* | 10/2021 | Rawat | G06N 3/045 |
| 2023/0186634 A1* | 6/2023 | Wong | G06Q 30/018 382/159 |
| 2023/0196558 A1* | 6/2023 | Wang | G06V 10/44 382/128 |
| 2023/0308930 A1* | 9/2023 | Xin | H04W 28/0215 |

OTHER PUBLICATIONS

Fries et al., "Weakly supervised classification of rare aortic valve malformations using unlabeled cardiac MRI sequences", Jun. 2018 (Year: 2018).*

Tuor et al., "Overcoming Noisy and Irrelevant Data in Federated Learning", Jan. 2021 (Year: 2021).*

Li, et al., "Multi-Site fMRI Analysis Using Privacy-Preserving Federated Learning and Domain Adaptation: ABIDE Results," *Medical Image Analysis* 65, pp. 1-19, Oct. 2020, Elsevier, Amsterdam, Netherlands.

Ratner, et al. "Snorkel: Rapid Training Data Creation with Weak Supervision," *The VLDB Journal* 29, pp. 709-730, Jun. 11, 2020, Springer Nature, London, UK.

Zhang, et al., "PPIS-JOIN: A Novel Privacy-Preserving Image Similarity Join Method," *Neural Processing Letters* 53, 3, pp. 1-19, Jun. 18, 2021, Springer Nature, London, UK.

Zhu, et al., "Privacy Preserving Similarity Evaluation of Time Series Data," *Proceedings 17th International Conference on Extending Database Technology (EDBT)*, pp. 499-510, Mar. 24-28, 2014, University of Konstanz Library, Konstanz, Germany.

Blundo, et al., "EsPRESSo: Efficient Privacy-Preserving Evaluation of Sample Set Similarity," *Journal of Computer Security* 22, 3, pp. 355-381, Mar. 20, 2014, IOS Press BV, Amsterdam, Netherlands.

Haddadpour, et al., "On the Convergence of Local Descent Methods in Federated Learning," pp. 1-49, Oct. 31, 2019, Cornell University Library, Ithaca, NY, USA.

Yang, Seunghan et al.; "Robust Federated Learning with Noisy Labels"; *IEEE Intelligent Systems*; Dec. 3, 2020; pp. 1-12; vol. 37; XP081828230; ArXiv.org; Cornell University; Ithaca, NY, USA.

Maresca, Fabio et al.; "OntoAugment: Ontology Matching through Weakly-Supervised Label Augmentation"; *Proceedings of the 17th ACM Conference on Embedded Networked Sensor Systems*; Nov. 15, 2021; pp. 420-425; XP058777959; ACM Publications; New York, NY, USA.

Solmaz, Gurkan et al.; "Label Augmentation with Reinforced Labeling for Weak Supervision"; *Proceedings of 2022 International Conference on Learning Representations*; Apr. 13, 2022; pp. 1-21; XP091203763; ArXiv.org; Cornell University; Ithaca, NY, USA.

Abhishek, Guttu Sai et al.; "SPEAR: Semi-supervised Data Programming in Python"; *Conference on Empirical Methods in Natural Language Processing*; Aug. 1, 2021; pp. 1-5; XP091026358; ArXiv. org; Cornell University; Ithaca, NY, USA.

\* cited by examiner

200

300

400

$$\gamma(L_1')$$

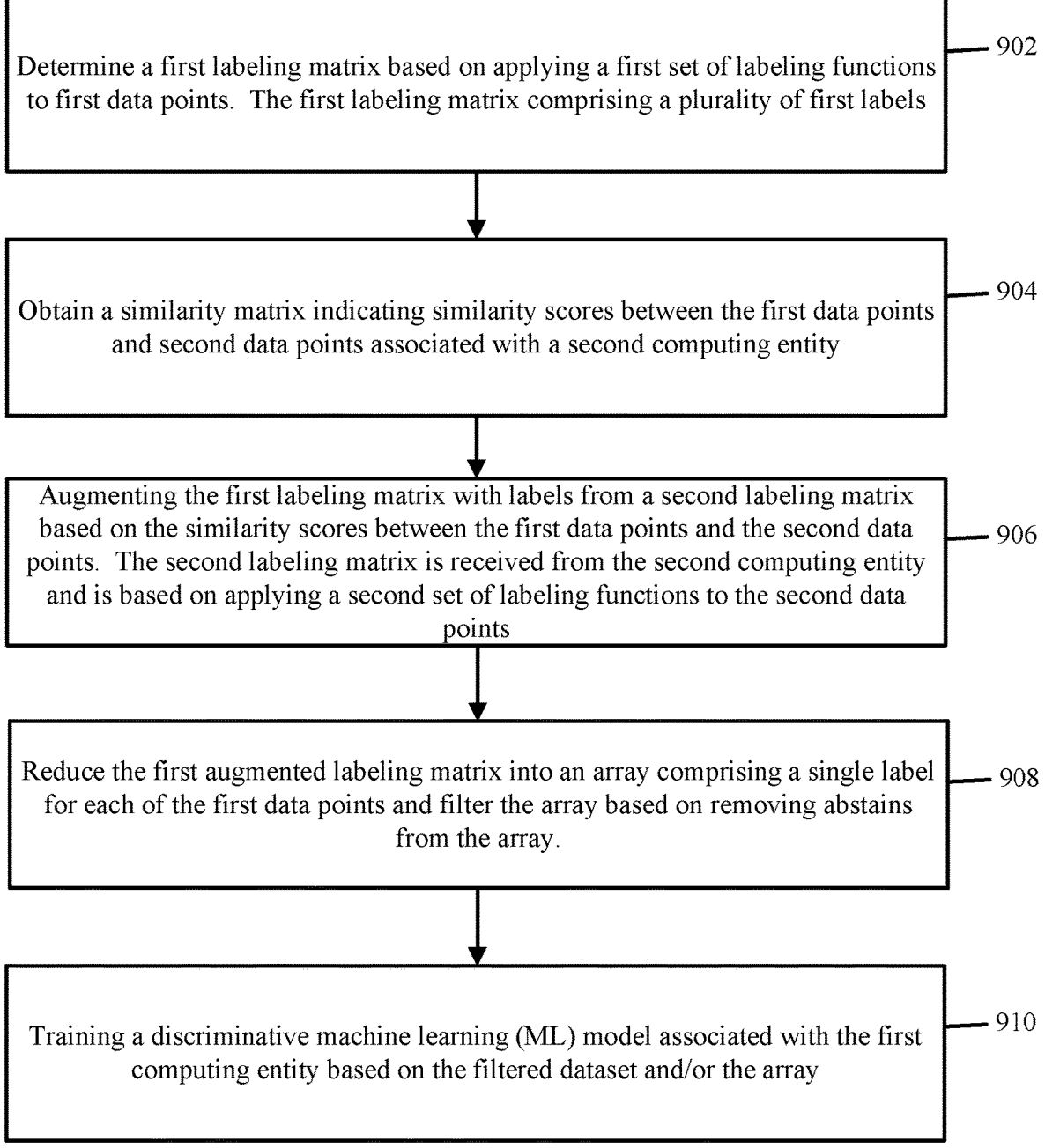

Determine a first labeling matrix based on applying a first set of labeling functions to first data points. The first labeling matrix comprising a plurality of first labels — 902

Obtain a similarity matrix indicating similarity scores between the first data points and second data points associated with a second computing entity — 904

Augmenting the first labeling matrix with labels from a second labeling matrix based on the similarity scores between the first data points and the second data points. The second labeling matrix is received from the second computing entity and is based on applying a second set of labeling functions to the second data points — 906

Reduce the first augmented labeling matrix into an array comprising a single label for each of the first data points and filter the array based on removing abstains from the array. — 908

Training a discriminative machine learning (ML) model associated with the first computing entity based on the filtered dataset and/or the array — 910

PRIVACY-PRESERVING FEDERATED MACHINE LEARNING

CROSS-REFERENCE TO PRIOR APPLICATION

Priority is claimed to U.S. Provisional Application No. 63/303,528 filed on Jan. 27, 2022, the entire contents of which is hereby incorporated by reference herein.

FIELD

The present invention relates to a method, system and computer-readable medium for privacy-preserving federated machine learning.

BACKGROUND

In complex machine learning models, a sufficiently large labeled dataset is needed for training. In some scenarios (e.g., healthcare, industrial Internet of Things (IoT), and/or automotive), sufficient data may be available such that machine learning (ML) models can be trained locally (i.e., where the data is collected). Yet, while the data might be abundant, labels are still needed for the data in order to train the ML model. Determining labels, however, can be resource intensive. Conceivably, the data could be shared with third-parties to offload some of the work on creating labeled datasets. Sharing data and distributing the labeling workload could be particularly useful in other scenarios where one or more entities do not have sufficient local data to effectively train their ML model. Nevertheless, sharing datasets among parties may not be a realistic solution because it is not privacy preserving (e.g., the data might leak industrial secrets or other confidential information).

One solution is to use federated learning. In federated learning, while there may be local computation of the ML models, the model's weights are shared between parties so that those weights may be aggregated. Federated learning techniques can be categorized as horizontal federated learning and vertical federated learning. Horizontal federated learning includes techniques where each of the involved nodes into the federation collects data with the same features set, but regarding different data points. The vertical federated learning includes techniques where the feature sets differ among nodes, while the data points refer to the same set (e.g., the datasets are aligned by the timestamp).

A concern with federated learning is that, if local convergence is not reached, a global convergence is not guaranteed (see, e.g., Haddadpour, Farzin, and Mehrdad Mandavi, "On the convergence of local descent methods in federated learning," arXiv preprint arXiv:1910.14425 (2019), the entirety of which is hereby incorporated by reference herein). For instance, if the ML model's weights cannot be determined at the local level (e.g., at the location where the data is collected), then determining a global ML model's weights may become more difficult. To reach local convergence, it is a challenge to have a labelled dataset sufficiently large and manual labeling can be very expensive and long. A solution can be to share the labeling functions among parties in order to share the costs to develop them. However, labeling functions are also assets and it might embed knowledge from an industrial company that might be not keen to give them away.

SUMMARY

In an embodiment, the present invention provides a method that preserves privacy in federated machine learning system. In the method, a first computing entity in the federated learning system determines a first labeling matrix based on applying a first set of labeling functions to first data points. The first labeling matrix includes a plurality of first labels. The first computing entity obtains a similarity matrix indicating similarity scores between the first data points and second data points associated with a second computing entity. The first computing entity augments the first labeling matrix by transferring labels from a second labeling matrix into the first labeling matrix using the similarity scores between the first data points and the second data points. The second labeling matrix is received from the second computing entity and is based on applying a second set of labeling functions to the second data points. The first computing entity trains a discriminative machine learning model associated with the first computing entity based on the first augmented labeling matrix.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 7 illustrates an exemplary labels aggregation according to one or more embodiments of the present invention;

FIG. 9 shows a process for transferring labels between nodes of a federated learning system according to one or more embodiments of the present invention.

DETAILED DESCRIPTION

Figure 1:
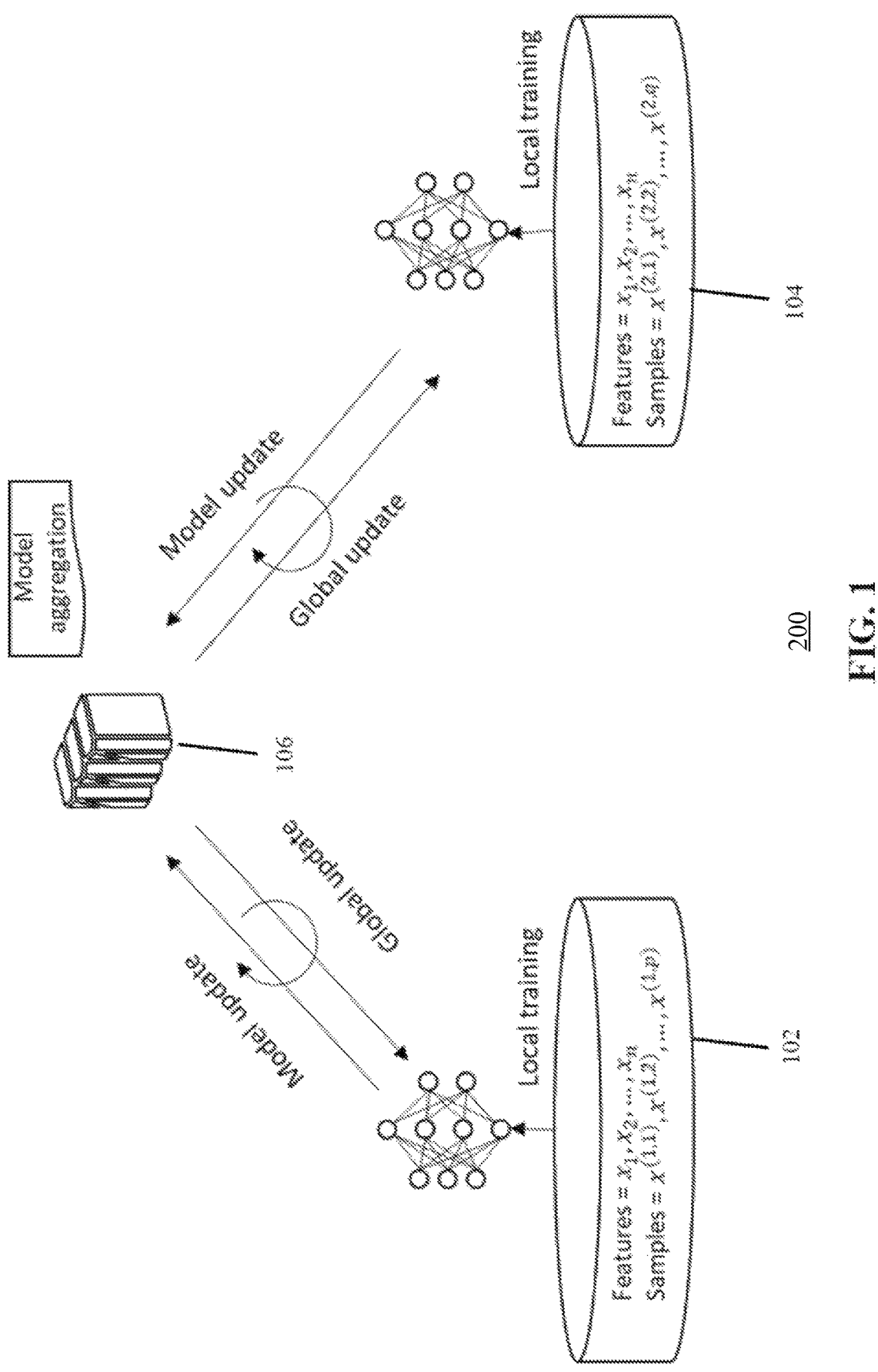
FIG. 1 schematically illustrates an exemplary federated learning system.

Embodiments of the present invention provide a system, method, and computer-readable medium for a privacy preserving federated machine learning. For example, an embodiment of the present invention provides a federated machine learning system to train a machine learning model with unlabeled datasets by using heuristics to noisily label the datasets. The system allows reaching local convergence (e.g., convergence at a location where data is collected) in each of the federated nodes (e.g., federated devices) by exploiting the similarity of data points among nodes (e.g., devices) and the noisy labels of every node without sharing among the nodes any of the original data or the heuristics. For instance, having noisy labels may indicate that the labels have a decent percentage (e.g., 60% to 70%) of correct labels, but also may indicate many incorrect labels (e.g., 40% to 30%) within the set. An incorrect label may be a label given to a data point that represents an incorrect or wrong class. An accurate label (e.g., a manual label) may be labels that are nearly always correct (e.g., the percentage of correct labels that are accurate labels is more than 95%).

Embodiments of the present invention increase the privacy of federated learning systems because analytics nodes do not share any data points between them, such as sensitive data. Further, the analytics nodes do not share any labeling functions among them, which might themselves divulge sensitive information, preserving the privacy of the associated analytics nodes. Exemplary embodiments also aim to have a convergence of the model trained locally at an analytics node without the need to manually label data points or to write too many labeling functions, which increases overall computational speed and saves computational resources.

In an embodiment, the present invention that preserves privacy in federated machine learning systems. The method comprises: determining, by a first computing entity in the federated learning system, a first labeling matrix based on applying a first set of labeling functions to first data points, the first labeling matrix comprising a plurality of first labels; obtaining, by the first computing entity, a similarity matrix indicating similarity scores between the first data points and second data points associated with a second computing entity; augmenting, by the first computing entity, the first labeling matrix by transferring labels from a second labeling matrix into the first labeling matrix using the similarity scores between the first data points and the second data points, the second labeling matrix is received from the second computing entity and is based on applying a second set of labeling functions to the second data points; and training, by the first computing entity, a discriminative machine learning (ML) model associated with the first computing entity based on the first augmented labeling matrix.

In an embodiment, the similarity matrix is obtained from a third computing entity of the federated learning system, the third computing entity being separate from the first computing entity and the second computing entity.

In an embodiment, the method further comprises: providing, by the first computing entity and to the third computing entity, first obfuscated data associated with the first data points, wherein the received similarity matrix indicates the similarity scores based on the first obfuscated data from the first computing entity and second obfuscated data associated with the second data points from the second computing entity.

In an embodiment, providing the first obfuscated data to the third computing entity comprises executing a privacy-preserving protocol, wherein the privacy-preserving protocol alters or encrypts the first data points prior to providing the altered or encrypted first data points to the third computing entity as the first obfuscated data.

In an embodiment, providing the first obfuscated data to the third computing entity comprises executing a privacy-preserving protocol, wherein the privacy-preserving protocol comprises executing a feature extraction protocol based on the first data points to generate the first obfuscated data.

In an embodiment, the method further comprises: providing, by the first computing entity and to the third computing entity, first model weights obtained from the trained discriminative ML model of the first computing entity; and receiving, from the third computing entity, a global ML model for the federated learning system that is determined based on the first model weights of the first computing entity and second model weights obtained from a second trained discriminative ML model associated with the second computing entity.

In an embodiment, the method further comprises: prior to determining the first labeling matrix, obtaining, by the first computing entity of the federated learning system, the first data points using one or more sensors locally associated with the first computing entity.

In an embodiment, the method further comprises: determining a transferred labeling matrix comprising a first submatrix indicating abstains associated with the first data points and a second submatrix indicating classifications associated with the second data points of the second computing entity; and replacing the abstains of the first submatrix with classifications of the second submatrix based on the similarity matrix indicating the similarity scores, wherein augmenting the first labeling matrix is based on the transferred labeling matrix with the abstains replaced with the classifications from the second submatrix.

In an embodiment, replacing the abstains of the first submatrix with the classifications of the second submatrix is further based on a lowest similarity score between an entry of a data point from the first submatrix and a plurality of entries from the second submatrix.

In an embodiment, replacing the abstains of the first submatrix with the classifications of the second submatrix is further based on a minimum distance function and a threshold value.

In an embodiment, the method further comprises: reducing the first augmented labeling matrix into an array, wherein each entry of the array indicates a single classification per data point of the first data points; and filtering the array to remove abstain classifications from the array, wherein training the discriminative ML model is based on the filtered array.

In an embodiment, reducing the first augmented labeling matrix into the array is based on a majority voter function or a generative model.

In another embodiment, the present invention provides a computing entity for preserving privacy in federated machine learning systems. The computing entity is associated with at least one processor and being configured to: determine a first labeling matrix based on applying a first set of labeling functions to first data points, the first labeling matrix comprising a plurality of first labels; obtain a similarity matrix indicating similarity scores between the first data points and second data points associated with a second computing entity; augment the first labeling matrix by transferring labels from a second labeling matrix into the first labeling matrix using the similarity scores between the first data points and the second data points, the second labeling matrix is received from the second computing entity and is based on applying a second set of labeling functions to the second data points; and train a discriminative machine learning (ML) model associated with the first computing entity based on the first augmented labeling matrix.

In a further embodiment, a tangible, non-transitory computer-readable medium having instructions thereon which, upon being executed by one or more processors, alone or in combination, provide for execution of a method according to any embodiment of the present invention.

As mentioned previously, federated learning techniques, such as the federal learning technique of FIG. 1, can be categorized as horizontal federated learning and vertical federated learning. FIG. 1 schematically illustrates an exemplary federated learning system 100. The federated learning system includes two local training nodes or systems 102, 104. A training node (e.g., a training device or system) may be configured to determine ML weights for a ML model based on data collected located. For instance, the training node 102 may be associated with a first local environment— such as a first smart building or a first industrial environment (e.g., a first factory). The training node 104 may be associated with a second local environment—such as a second smart building or a second industrial environment (e.g., a second factory).

Each training node 102 and 104 may collect datapoints (e.g., sensor data and/or other data) from the local environment. Based on the collected datapoints, each training node 102 and 104 may determine ML weights or other features associated with the ML model. ML weights are learnable parameters of an ML model such as a neural network (NN). The ML weights control the signal between two connection points (e.g., the weight determines the influence that an input can have on an output). For instance, a training data set (e.g., the collected set of data points or samples) is a set of examples (e.g., example data) used to fit the ML parameters. A data point (e.g., a sample, x) is a discrete unit of information. For example, any single fact is a data point. In a statistical or analytical context, a data point may be derived from a measurement or research, and can be represented numerically and/or graphically. In other words, a data point may be equivalent to datum (e.g., a singular form of data). A feature is an individual measurable property or characteristic of a phenomenon. The selection of features (e.g., informative, discriminating, and independent features) is an element of effective algorithms in pattern recognition, classification, and regression within ML and pattern recognition.

Local convergence can be understood as the ability for the training nodes 102 and 104 to determine ML weights for their ML models using the datapoints collected from their environment. In federated learning, the weights determined at different training nodes (e.g., the weights determined using the datapoints from the first node 102 and the second node 104) can be provided to a computing system 106 (e.g., a computing server). For instance, the nodes 102 and 104 can provide model updates (e.g., the determined ML weights from the datapoints collected from their environment) to the computing system 106. The computing system 106 aggregates and determines global ML weights for the ML models of the federated learning system 100 based on the local ML weights of the individual nodes such as nodes 102 and 104. Then, the computing system 106 provides global updates (e.g., the global ML weights) back to the individual nodes 102 and 104 for them to use for their ML models. In some instances, such as continuous learning instances, the nodes 102 and 104 may continuously update their weights using new datapoints from their environment and continuously provide model updates (e.g., their updated weights) to the computing system 106. The computing system 106 may continuously use the model updates from multiple nodes to provide global updates (e.g., global weights) back to the nodes 102 and 104.

Horizontal federated learning comprises techniques where each of the involved nodes in the federation collects data with the same features set but regarding different data points. The vertical federated learning comprises techniques where the feature sets differ among nodes while the data points refer to the same set (e.g., the datasets are aligned by the timestamp). In some embodiments, the present disclosure describes systems using the horizontal federated learning category.

Figure 2:
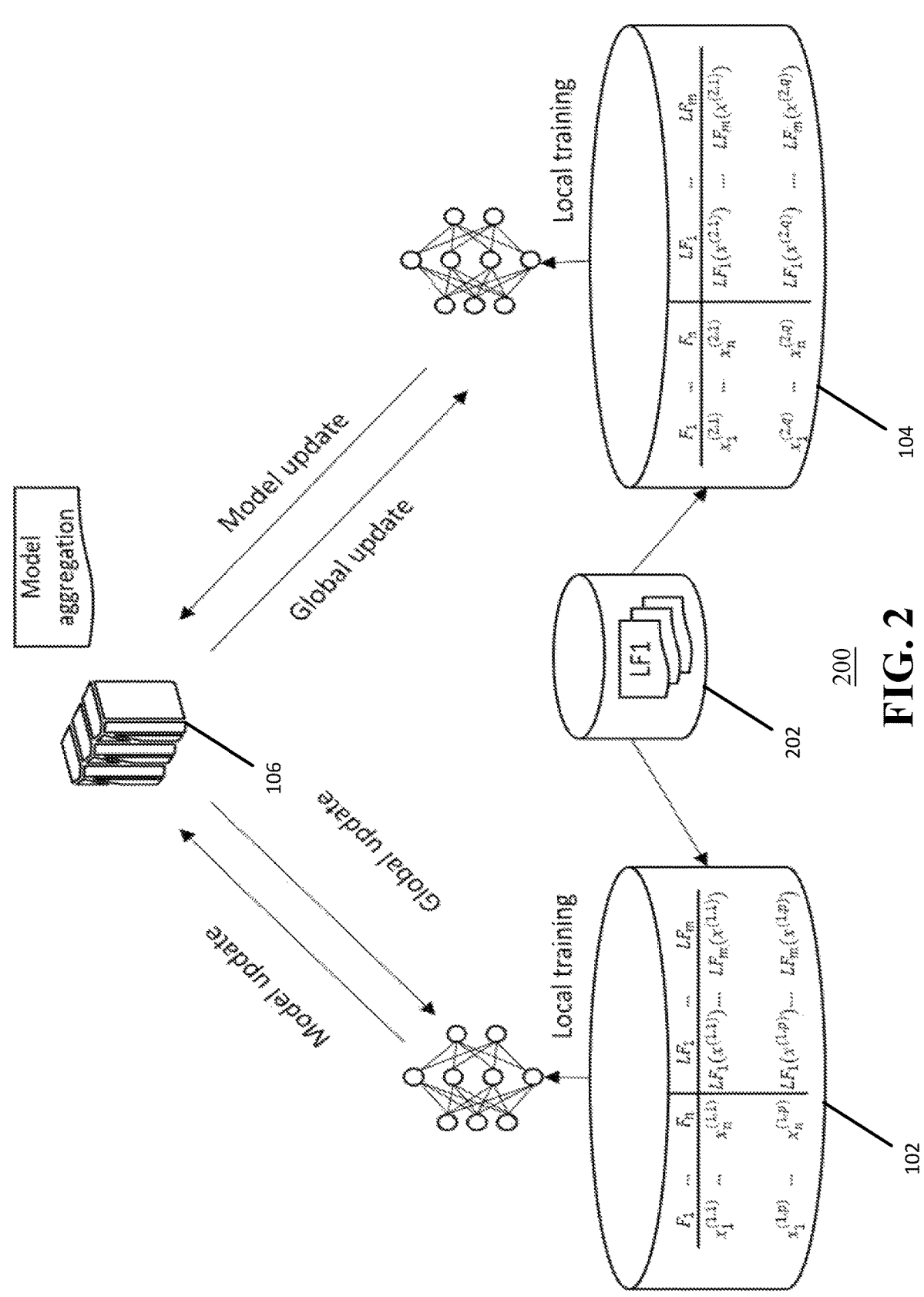
FIG. 2 schematically illustrates exemplary federated learning using weak supervision of labeling functions.

To reach local convergence, it may be a challenge to have a labelled dataset big enough. The manual labeling might be very expensive and long. In some instances, as shown in FIG. 2, weak supervision of labeling functions to nosily annotate data points may be used to reach local convergence. FIG. 2 schematically illustrates exemplary federated learning using weak supervision of labeling functions. For instance, the local training nodes 102 and 104 as well as the computing system 106 are shown in the federated learning system 200. Furthermore, between the local training nodes 102 and 104 is a computing system 202 for weak supervision of labeling functions (LF). For instance, the computing system 202 performs weak supervision of labeling functions such as LF1.

Weak supervision may be a branch of ML where unorganized or imprecise data is used to provide indications to label a large amount of unsupervised data such that a large amount of data may be used in ML or supervised learning. For instance, weak supervision may be a branch of machine learning where noisy, limited, or imprecise sources are used to provide supervision signal for labeling large amounts of training data in a supervised learning setting. This approach may alleviate burdens of obtaining hand-labeled data sets, which may be costly or impractical. Instead, inexpensive weak labels may be employed with the understanding that they are imperfect, but can still be used to create a strong predictive model. In other words, supervised ML deals with accurate labels (e.g., ground-truths) whereas weak supervised ML deals with noisy labels, which are described above.

By using the federated learning system 200, the noisy labels are, then, aggregated to have a single label per data point. A successful aggregation of the noisy labels reaches a good coverage of the dataset with redundant labels. For this purpose, a large number of labeling functions are used. The implementation of such functions requires domain experts and, therefore, they might be costly.

In some instances, another solution that is used is to share the labeling functions among parties in order to share the costs to develop them. However, labeling functions are also assets, and it might embed knowledge from an entity (e.g., an industrial company) that that entity might be not be keen to give away.

As such, the present invention appreciates and addresses at least the following challenges in federated learning system:

Reaching local convergence of a ML model with few labeling functions;

Not sharing any datapoints between parties;

Not sharing labeling functions between parties.

In some instances, aspects of the present disclosure may describe examples when compute nodes have abundant data points, but few labels. With programmatic labeling, it is possible to annotate data points through functions that yield noisy labels. However, developing such function to have high accuracy and high coverage is rather challenging and expensive.

Some state of the art solutions consider sharing the labeling functions code with each other. However, those functions might be an asset for the developing teams that might be not keen to share.

Figure 3:
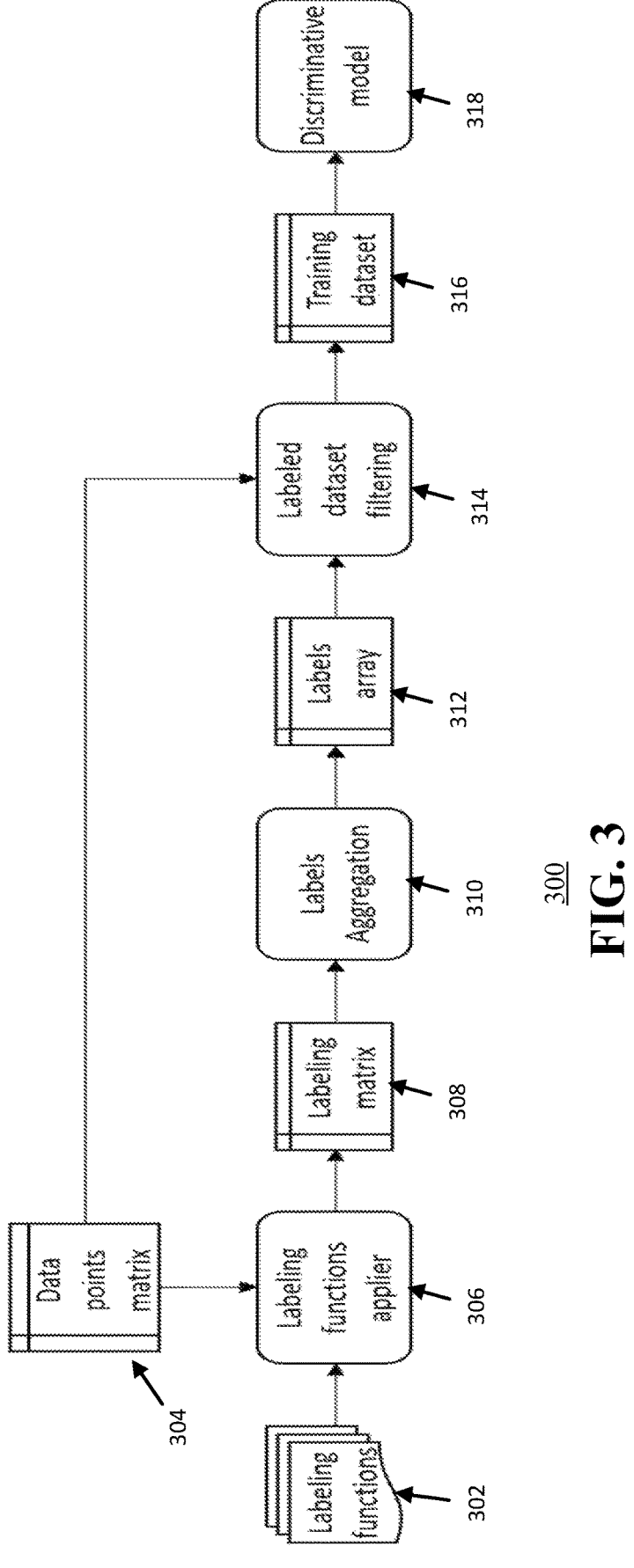
FIG. 3 schematically illustrates an exemplary weak supervision workflow.

FIG. 3 shows a weak supervision workflow 300. In normal programmatic labeling, a labeling functions applier 306 applies a set of labeling functions 302 to the data points matrix 304. For example, a computing device (e.g., a local node such as node 102 or 104 in the federation systems 100 or 200) may apply a set of labeling functions (LF) 302 to a matrix of data points 304. Each data point within the matrix 304 (e.g., a sample) can be an array of values, one value per feature, and can represent a discrete unit of information.

By applying the set of LF 302 to the data points matrix 304, the computing device generates a labeling matrix 308 recording the labels. Each labeling function yields either a class or an abstain (−1). A class may be an output category of the data point based on applying the labeling function to the data point. The labeling matrix 308 has rows as the number of data points in the data points matrix 304 and columns as the number of labeling functions 302. In some examples, every row of the labeling matrix 308 can include a different combination of classes and abstains. To put it another way, the computing device can generate a labeling matrix 308 with rows indicating the data points from the data points matrix and the columns indicating the labeling functions. Each entry within the labeling matrix 308 may indicate an identifier (e.g., a class or an abstain (−1)) associated with applying the particular labeling function to the data point. For instance, the entry for row 5, column 6 may indicate a class or abstain for the fifth data point in the data points matrix and the sixth labeling function.

The computing device may use labels aggregation 310 to decide (e.g., determine) a single label per data point or an abstain in case of high uncertainty. The labels array 312 includes one label or abstain per data point.

The computing device may determine a labels array 312 indicating a label or abstain for each data point. For instance, based on the labeling matrix 308, each data point may be associated with a plurality of classes/abstains based on applying the labeling functions 302 to the data point. Based on the plurality of classes/abstains, the computing device may use one or more processes or algorithms to determine a single label or an abstain for the data point. For instance, the single label may indicate a class, from the plurality of classes, that was determined by a significant subset of labeling functions (e.g., a majority of labeling functions). In some instances, the significant subset of labeling functions may indicate an abstain for the data point, and the computing device may determine abstain for the data point for the labels array.

The labeled dataset filtering 314 associates the labels to the data points and keeps only the data points with a decided label, discarding data points with abstains. This operation generates a training dataset 316. For instance, the computing device may remove/discard data points with abstains from the labels array such that only the data points with a decided label are left. The remaining data points with a decided label may be used as a training dataset 316 for the ML model. Thus, the less abstains that are contained in the labels array, the bigger is the training dataset. The discriminative model 318 (e.g., the ML model) is trained with the training dataset. In general, with a bigger training dataset 316 the discriminative model 318 results in better training for the ML model.

One or more aspects of the present disclosure provide a method and a system to increase the size of labels array for better training of the ML models by the local nodes. Additionally, and/or alternatively, the method and system described herein may increase the size of the labels array without sharing labeling functions and/or without sharing the data points between computing nodes.

In a first aspect, the present disclosure provides a method that preserves privacy in federated machine learning system. In the method, a first computing entity in the federated learning system determines a first labeling matrix based on applying a first set of labeling functions to first data points. The first labeling matrix includes a plurality of first labels. he first computing entity receives, from a second computing entity of the federated learning system, a second labeling matrix having a plurality of second labels. The second labeling matrix is transferred from the second computing entity and is based on applying a second set of labeling functions to second data points. The first computing entity obtains a similarity matrix indicating similarity scores between the first data points and the second data points; and trains a discriminative machine learning model associated with the first computing entity based on the first labeling matrix, the second labeling matrix, and the similarity matrix.

In a second aspect, the similarity matrix may be obtained from a third computing entity of the federated learning system, the third computing entity being separate from the first computing entity and the computing entity.

In a third aspect, the method may further include: providing, by the first computing entity and to the third computing entity, first obfuscated data associated with the first data points. The received similarity matrix may indicate the similarity scores based on the first obfuscated data from the first computing entity and second obfuscated data associated with the second data points from the second computing data.

In a fourth aspect, the providing the first obfuscated data to the third computing entity may include executing a privacy-preserving protocol. The privacy-preserving protocol may alter or encrypt the first data points prior to providing the altered or encrypted first data points to the third computing entity as the first obfuscated data.

In a fifth aspect, providing the first obfuscated data to the third computing entity may include executing a privacy-preserving protocol. The privacy-preserving protocol may include executing a feature extraction protocol based on the first data points to generate the first obfuscated data.

In a six aspect, the method may further include: providing, by the first computing entity and to the third computing entity, first model weights obtained from the trained discriminative ML model of the first computing entity; and receiving, from the third computing entity, a global ML model for the federated learning system determined based on the first model weights of the first computing entity and second model weights obtained from a second trained discriminative ML model associated with the second computing entity.

In a seventh aspect, the method may include, prior to determining the first labeling matrix, obtaining, by the first computing entity of the federated learning system, the first data points using one or more sensors locally associated with the first node.

In an eighth aspect, the first set of labeling functions may be different from the second set of labeling functions, and the first data points may be different from the second data points.

In a ninth aspect, the method may further include: determining a transferred labeling matrix comprising a first submatrix indicating abstains associated with the first data points and a second submatrix indicating classifications associated with the second data points of the second computing entity; and replacing the abstains of the first submatrix with classifications of the second submatrix based on the similarity matrix indicating the similarity scores.

In a tenth aspect, replacing the abstains of the first submatrix with the classifications of the second submatrix may be further based on a lowest similarity score between an entry of a data point from the first submatrix and a plurality of entries from the second submatrix.

In an eleventh aspect, replacing the abstains of the first submatrix with the classifications of the second submatrix may further be based on a minimum distance function and a threshold value.

In a twelfth aspect, the method may further include: determining an array based on the transferred labeling matrix, wherein each entry of the array indicates a single classification per data point of the first data points, wherein training the discriminative ML model is based on the array.

In a thirteenth aspect, determining the array may be based on a majority voter function or a generative model.

According to various aspects of the present disclosure, the method according to the first aspect may be implemented with any combination of the second through thirteenth aspects of the present disclosure.

According to a fourteenth aspect of the present disclosure, a computing entity of a privacy preserving federated machine learning system is provided. The computing is associated with at least one processor and is configured to: determine a first labeling matrix based on applying a first set of labeling functions to first data points, the first labeling matrix comprising a plurality of first labels; receive, from a second computing entity of the federated learning system, a second labeling matrix comprising a plurality of second labels, the second labeling matrix being determined transferred from the second computing entity and being based on applying a second set of labeling functions to second data points; obtain a similarity matrix indicating similarity scores between the first data points and the second data points; and train a discriminative machine learning (ML) model associated with the first computing entity based on the first labeling matrix, the second labeling matrix, and the similarity matrix. According to various aspects of the present disclosure, the computing entity of the fourteenth aspect may include any combination of the second through thirteenth aspects of the present disclosure.

According to a fifteenth aspects of the present disclosure, a tangible, non-transitory computer-readable medium is provided. The computer-readable medium has instructions thereon which, upon being executed by one or more processors, alone or in combination, provide for execution of a method including: determining, by a first computing entity in the federated learning system, a first labeling matrix based on applying a first set of labeling functions to first data points, the first labeling matrix comprising a plurality of first labels; receiving, by the first computing entity and from a second computing entity of the federated learning system, a second labeling matrix comprising a plurality of second labels, the second labeling matrix being determined transferred from the second computing entity and being based on applying a second set of labeling functions to second data points; obtaining, by the first computing entity, a similarity matrix indicating similarity scores between the first data points and the second data points; and training, by the first computing entity, a discriminative machine learning (ML) model associated with the first computing entity based on the first labeling matrix, the second labeling matrix, and the similarity matrix. According to various aspects of the present disclosure, the computer-readable medium of the fifteenth aspect may include any combination of the second through thirteenth aspects of the present disclosure.

Figure 4:
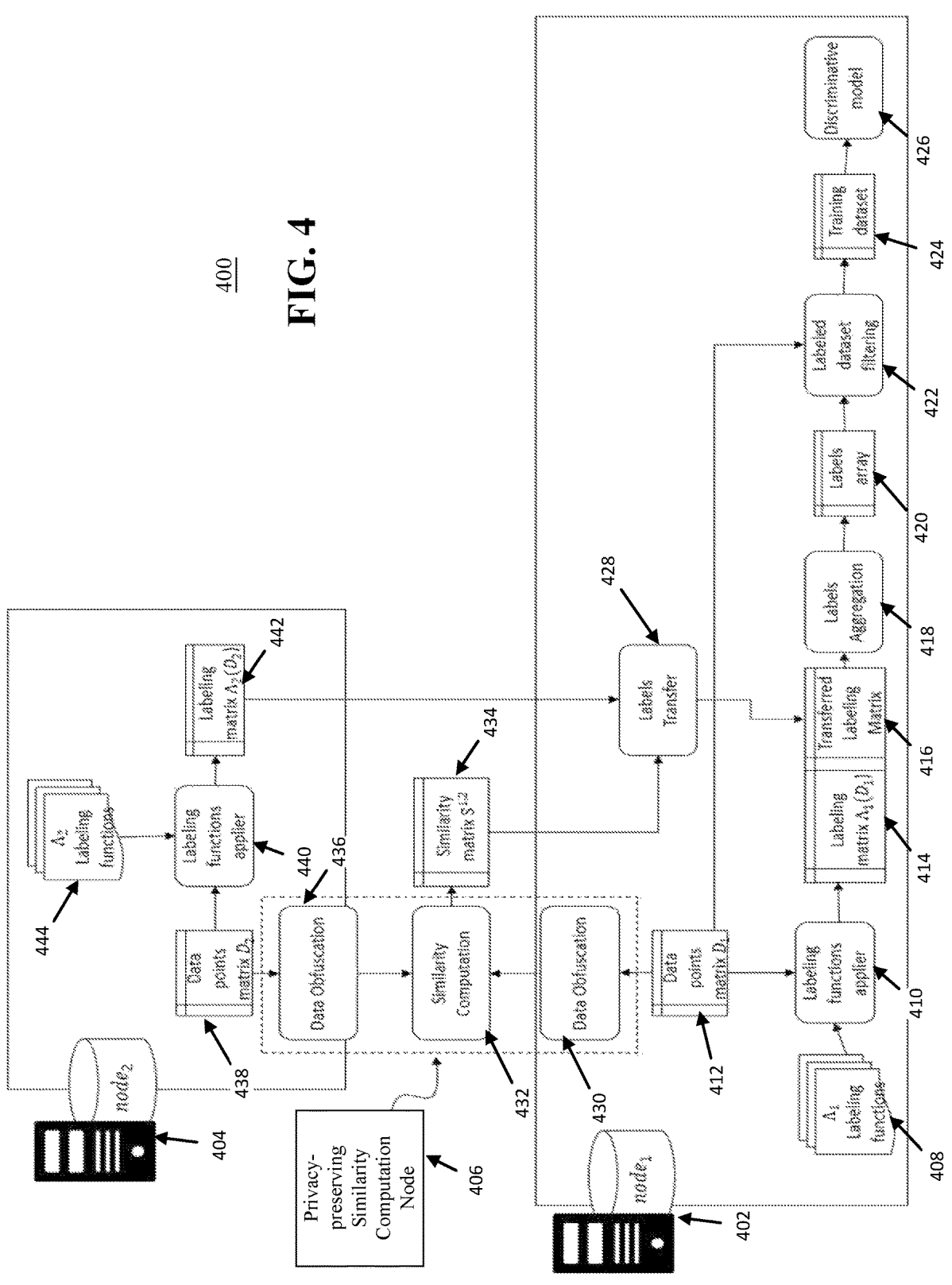
FIG. 4 shows the architecture of an embodiment of the present invention considering the collaboration between two devices according to one or more embodiments of the present invention.

FIG. 4 shows the architecture of an embodiment of the present invention considering the collaboration between two devices (e.g., local nodes) according to one or more embodiments of the present invention.

FIG. 4 shows the architecture 400 of an exemplary embodiment of the present disclosure that uses the collaboration between two nodes (e.g., the first node 402 (node₁) and the second node 404 (node₂)) for better training the respective ML models. The system architecture 400 and process described below focuses on the operation of the first node 402, but the same operations may also occur at the second node 404. While only two nodes 402 and 404 are shown, in some embodiments, the system architecture 400 may include more than two nodes including any number of nodes. For instance, the federation system (e.g., the system architecture 400) may include a plurality of nodes that are used to increase the size of the label arrays for each of the nodes of the federation system so as to better train the ML models for each of the nodes.

Embodiments of the present disclosure provide a number of improvements over the state-of-the-art including, but not limited to:

Privacy-preserving similarity computation, which can include data obfuscation and/or similarity computation that produces a similarity score between data points owned by different nodes; and/or Labels transfer that transfer the knowledge included within the labels matrix of one node to another node. In some instances, the labeling functions might not be transferred between the nodes for security and/or confidentiality reasons described above, but information within the labels matrix may be transferred.

The following details the description of exemplary embodiments of the system 400 and the components.

Initial setup: A labeling function applier (e.g., labeling functions applier 440 of the second node 404 or the labeling functions applier 410 of the first node 410) processes a data point from the data points matrix (e.g., data points matrix 412 or the data points matrix 438) using labeling functions (e.g., labeling functions 408 or labeling functions 444) and returns either a class (e.g., class 1 or class 0, for binary classification implementations) or an abstain (e.g., encoded as −1). Further, in some instances, the first node 402 and the second node 404 might not share any data points or labeling functions with each other. For instance, while certain information (e.g., similarly matrices and/or similarity computations) may be shared with each other, the actual data points (e.g., the sensor data from the local environments and/or other types of data points) as well as the actual labeling functions might not be shared between the nodes 402 and 404. As such, given that labeling functions 408, 444 and data points from the data points matrix 412, 438 may include sensitive and/or confidential information for the nodes (e.g., the industrial facility or the smart building), an embodiment of the present invention may prevent sharing of the sensitive and/or confidential information by using privacy-preserving similarity computations so as to increase the size of the labels array (e.g., increase the number of identified classes and decreasing the number of abstains) for better training of the individual ML models at the nodes 402 and 404.

For example:

1) The first node 402 includes:

a) $\Lambda_1$—a set of labeling functions 408: $\Lambda_1 = [\lambda_{1,1}, \lambda_{1,2}, \ldots, \lambda_{1,l}]$, where $\lambda$ represents a specific labeling function and l representing the last labeling function of the first set of labeling functions.

b) $D_1$—a dataset 412 composed of data points of n features: $D_1 = [x^{(1,1)}, x^{(1,2)}, \ldots, x^{(1,p)}]$, where x (e.g., $x^{(1,1)}$) represents a data point from the data set and p represents the last data point of the first dataset.

2) The second node 404 includes:
    a) $\Lambda_2$—a set of labeling function 444: $\Lambda_2=[\lambda_{2,1}, \lambda_{2,2}, \ldots, \lambda_{2,k}]$, where $\lambda$ represents a specific labeling function and k representing the last labeling function of the first set of labeling functions.
    b) $D_2$—a dataset 438 composed of data points of the same n features of $D_1$ with x representing a data point from the data set and q representing the last data point of the first dataset: $D_2=[x^{(2,1)}, x^{(2,2)}, \ldots, x^{(2,q)}]$
3) A data point $$- x^{(i,j)} = \left[x_1^{(i,j)}, x_2^{(i,j)}, \ldots, x_n^{(i,j)}\right], \text{ where } x^{(i,j)}$$

represents a data point from the set as mentioned above, which can include an array of values with one value per feature (e.g., $$\left(\text{e.g., } x_1^{(i,j)} \text{ or } x_2^{(i,j)}\right).$$

In other words, D represents the datasets 412 and 438, x represents a data point within the datasets 412 and 438. The data point, x (e.g., $x^{(i,j)}$), is an array of values with one value per feature. As such, $$x_1^{(i,j)}, x_2^{(i,j)}$$

and so on represent the features themselves from the data point x.
    4) $D_1 \neq D_2$. For instance, the dataset for the first node 402 may be different from (e.g., not equal to) the dataset from the second node 404.
    5) (optional) $\Lambda_1 \neq \Lambda_2$. In other words, in some instances, the first set of labeling functions of the first node 402 may be different from (e.g., not equal to) the second set of labeling functions of the second node 404. In other instances, they may be the same.

For example, referring to a technical embodiment (e.g., the embodiment shown in FIG. 8, which is described in further detail below) where the nodes represent different buildings, and each building is an office. The measured phenomena (e.g., features such as $$x_1^{(i,j)} \text{ or } x_2^{(i,j)})$$

may be: events calendar of conference room, rooms occupancies, ratio of presence/absence at work of workers in that building, energy consumed, day of week. The nodes may train an ML model or discriminative model for classifying anomalies on the energy consumption. As such, the labeling functions 408/444 may include the following functions:
    1) function(bool eventInConferenceRoom, float floorEnergyConsumption):

```
if (not eventInConferenceRoom and floorEnergyConsumption > 1 KW)
then:
    anomaly = true
else
    anomaly = abstain.
```

2) function(float absenceRatio, float floorEnergyConsumption):

```
if (absenceRatio > 50% and floorEnergyConsumption > 2 KW) then:
    anomaly = true
else
    anomaly = abstain.
```

3) function(float occupanciesFloor, float floorEnergyConsumption):

```
if (occupanciesFloor > 50% and floorEnergyConsumption < 3 KW) then:
    anomaly = false
else
    anomaly = abstain.
```

Computation at analytics node (e.g., at the second node 404) may be performed. The second node 404 (e.g., a computing device at the second node 404), using a labeling functions applier 440, may apply every labeling function (e.g., one of the three functions provided above) included in the set of labeling functions $\Lambda_2$ 444 (e.g., the labeling functions $\lambda$ such as $[\lambda_{2,1}, \lambda_{2,2}, \ldots, \lambda_{2,k}]$) to every data point included in the second dataset $D_2$ 438 (e.g., $[x^{(2,1)}, x^{(2,2)}, \ldots, x^{(2,q)}]$). Based on applying the labeling functions 444 to the datasets 438, the second node 404 may determine a labeling matrix $L_2$ 442 (e.g., the result may be a labeling matrix $L_2=\Lambda_2 (D_2)$). The resultant labeling matrix 442 can be of size q×k, and the element $l_{v,w}$ corresponds to the application of labeling function $\lambda_{2,w}$ to the data point $x^{(2,v)}$: $l_{v,w}=\lambda_{2,w}(x^{(2,v)})$. For a binary classification problem, there may be outputs—"0", "1", and abstain ("−1"). $l_{v,w} \in \{-1,0,1\}$ represents the binary classification problem with the outputs. In other words, the resultant labeling matrix 442 can have a size of q×k, which are defined above and associated with the number of labeling functions and data points for the second node 404. Further, each element or entry within the matrix $(l_{v,w})$ corresponds to an application of a particular labeling function (e.g., $\lambda_{2,w}$, with w representing a particular labeling function from the second set of labeling functions for the second node 404) to a particular data point (e.g., $x^{(2,v)}$, with v representing the particular data point from the second set of data points for the second node 404). As such, the element $l_{v,w}$ may be defined by the following equation: $l_{v,w}=\lambda_{2,w}(x^{(2,v)})$. In some instances, the labeling for the second node may result in a binary classification problem, which includes two types of classes (e.g., class 1, which is represented by "1", and class 0, which is represented by "0"). The "−1" may be an abstain, which is described above. Therefore, for the binary classification problem, the outputs for the element $l_{v,w}$ can be represented by $l_{v,w} \in \{-1,0,1\}$. In other instances, the labeling may include a different type of classification problems (e.g., may include three or more classes) that can be determined for each data point.

Privacy-preserving similarity computing may also be performed by node 406. For instance, a third party node 406 (e.g., another computing system or device that is separate from the first node 402 and the second node 404) computes a similarity matrix 434 between the data points $x \in D_1$ and the data points $x \in D_2$. The similarity matrix 434 indicates similarities between the data points from the first node 402 (e.g., $x \in D_1$) and data points from the second node 404 (e.g., $x \in D_2$). This results into a matrix $S^{1,2}$ where element $\sigma(x^{1,v}, x^{2,w})=s_{v,w} \in S^{1,2}$ is a similarity metric a applied to data points $x^{1,v}$ and $x^{2,w}$. "s" represents the similarity score (e.g., a value that represents how similar two data points are), "v" is a data point of set $D_1$ and "w" is a data point of set $D_1$. In other words, the third party node computes a similarity matrix $S^{1,2}$ that includes entries or elements $\sigma(x^{1,v}, x^{2,w})$ indicating a similarity metric $\sigma$ for each of the data points.

In some instances, the privacy-preserving similarity computation process may compute the similarity matrix 434 without having access to the original data from the first node 402 and/or the second node 404. For instance, the first and/or second nodes 402 and 404 may perform data obfuscation 436, 430, and then provide the obfuscated data to the third node. The third node may compute the similarity matrix based on the obfuscated data. Several non-limiting techniques are available describing how to compute this similarity metric on images (see, e.g., Zhang, Chengyuan, et al. "PPIS-JOIN: A Novel Privacy-Preserving Image Similarity Join Method." Neural Processing Letters (2021): 1-19, the entirety of which is hereby incorporated by reference herein, that uses deep image hashing method and an affine transformation method to generate high quality hash codes.), time series (see, e.g., Zhu, Haohan, Xianrui Meng, and George Kollios, "Privacy Preserving Similarity Evaluation of Time Series Data." EDBT. Vol. 2014. 2014, the entirety of which is hereby incorporated by reference herein, that proposes Dynamic Time Warping and Discrete Fréchet Distance method that encrypt the original time series data and hide intermediate results by using partial homomorphic encryption and random offsets), or sample sets (see, e.g., Blundo, Carlo, Emiliano De Cristofaro, and Paolo Gasti, "EsPRESSo: efficient privacy-preserving evaluation of sample set similarity." Data Privacy Management and Autonomous Spontaneous Security, Springer, Berlin, Heidelberg, 2012. 89-103, the entirety of which is hereby incorporated by reference herein, that securely computes the Jaccard index of two sets and approximates it MinHash techniques). In some instances, the similarity matrix may use other techniques, processes, or algorithms to determine the similarity metrics.

In some embodiments, videos might be preprocessed at a local node (e.g., nodes 402 and 404) by a convolutional neural network framework. The local node may use the extracted features or the original video as data points to be used for calculating the labels and for training the local machine learning model. In some instances, only the extracted features (e.g., the outputs from the neural network framework) may be shared with the node 406 and used for calculating the similarity score, thus preventing leakage of sensitive information contained into the original data. In other embodiments, envisaging text-based data point, an NLP embedding may be applied on text and only the output of such embedding may be shared with the node 406 for similarity computation while the original sensitive data might be used for local application of labeling functions and end model local training.

In some embodiments, the privacy-preserving similarity computation may be performed with a data obfuscation phase done within the local nodes. For instance, the first node 402 and the second node 404 may obfuscate their data points at blocks 430 and 436, and then provide the obfuscated data (e.g., the data points) to the third party node 406 (e.g., share the obfuscated data with the third party), which uses the obfuscated data to compute the similarity matrix 434. In some embodiments, the data obfuscation may include altering or encrypting the data following one or more privacy-preserving protocols. In some embodiments, the data obfuscation is a feature extraction process. For instance, the first node 402 and the second node 404 may use one or more feature extraction processes (e.g., processes for extracting features or certain data from a raw set of data) to extract data from their data points and provide the extracted data to the third node. In some embodiments, the computation may be done by a trusted third party using the original data. For example, a remote attested process in a cloud may be used for this purpose. In other words, in such embodiments, the third party node may be a trusted party. The first and second nodes 402 and 404 may provide the original data to the third party node given that the third party node is trusted party. The third party node may determine the similarity matrix In some embodiments, the role of the privacy-preserving similarity computing node 406 can be assumed by one of the analytics nodes (e.g., the first node 402).

In some embodiments, parties (e.g., the first node 402 and the second node 404) can agree on a protocol (e.g., a data obfuscation protocol, a privacy-preserving protocol, a feature extraction process, and/or using a trusted third party) and comply with the protocol for an effective privacy-preserving similarity computation before joining the federation.

Computation at analytics node (e.g., the first node 402) may be performed. For instance, similar to the second node 404, the first node 402 computes the labeling matrix 414 $L_1 = \Lambda_1(D_1)$. For example, the first node 402 (e.g., a computing device at the first node 402) may apply every labeling function included in the set of labeling functions $\lambda_1$ 408 to every data point included in the first dataset $D_1$ 412. Based on applying the labeling functions to the datasets, the first node 402 may determine a labeling matrix $L_1$ 414. Then, the first node 402 performs a labels transfer computation 428.

The labels transfer first generates a transferred labeling matrix $G_1$ 416 of size $(p+q) \times k$. An example of the transferred labeling matrix 416 is shown in Table 1.

TABLE 1

|  | $\lambda_{2,1}$ | ... | $\lambda_{2,k}$ |
|---|---|---|---|
| $x^{(1,1)}$ | −1 | ... | −1 |
| ... | ... | ... | ... |
| $x^{(1,p)}$ | −1 | ... | −1 |
| $x^{(2,1)}$ | $\lambda_{2,1}(x^{(2,1)})$ | ... | $\lambda_{2,k}(x^{(2,1)})$ |
| ... | ... | ... | ... |
| $x^{(2,q)}$ | $\lambda_{2,1}(x^{(2,q)})$ | ... | $\lambda_{2,k}(x^{(2,q)})$ |

The first p rows of the transferred labeling matrix 416 are filled with abstain values (−1). Whereas, the submatrix formed by rows p+1 to p+q is equal to labeling matrix $L_2 = \Lambda_2(D_2)$. In other words, the transferred labeling matrix 416 includes two submatrices. The columns of the transferred labeling matrix (e.g., the matrix shown in Table 1) indicates the second labeling functions (e.g., the transferred functions $\lambda_{2,1}, \lambda_{2,2}, \ldots, \lambda_{2,k}$). The rows are separated into a first set of rows (p) and a second set of rows (q). The first set of rows are filled with abstain values ("−1") and the second set of rows are filled with entries for applying the particular labeling function from the second set of labeling functions to the second data points (e.g., $\lambda_{2,w}(x^{(2,v)})$). To put it another way, the transferred labeling matrix 416 includes two submatrices—a first submatrix that indicates abstain values (−1) for the first data points and a second submatrix that indicates the labeling matrix that is computed by the second node 404. As such, instead of providing either the data points from the second node 404 and/or the actual labeling functions from the second node 404, the first node

402 receives only entries or elements (e.g., results) from applying the second labeling functions to the second data points.

Afterwards, the labels transfer is then calculating for each element $g_{r,t} \in G_1$, $r \in [1,p]$, $t \in [1,k]$ an augmented label. Here, "r" represents an index that ranges from 1 to the amount of data points in $D_1$, and t represents an index that ranges from 1 to the amount of labeling functions at the second node 404. In particular $g_{r,t} = \psi(G_1, S_{1,2})$. Function $\psi(\bullet)$ is the augmentation function in the labels transfer component that replaces abstains (e.g., −1) with a label when possible. For doing so, the labels transfer component uses the similarity matrix $S^{1,2}$ 434. The implementation of this augmentation function $\psi(\bullet)$ can be done in different ways that are described below. To put it another way, the labels transfer 428 is applied on g that is an element of G part of the first submatrix as described above. In particular, the element g refers to a data point part of the first node data set $D_1$ and of the transferred function from the second node 404 (associated to the labeling functions set $\Lambda_2$) into the first node 402.

In other words, the transferred labeling matrix $G_1$ 416 includes elements or entries g. The elements are at a particular row (p) and column (k). The first node 402 may use the function $\psi$, which uses the transferred labeling matrix $G_1$ 416 and the similarity matrix $S_{1,2}$ 434, to determine the elements g of the first submatrix (e.g., the submatrix of associated with the first set of rows (p)). For instance, the first node 402 may use the function to replace one or more abstains (e.g., −1) within the first submatrix with labels or classes (e.g., for binary classification, the first node 402 may use the function to replace one or more abstains with a binary classification such as "0" or "1").

In some embodiments, the lower the similarity score between two points, the more similar the two points may be. As such, for each data point from the first dataset $D_1$, the first node 402 may determine the lowest similarity score from the similarity matrix $S^{1,2}$ between the data point from the first dataset $D_1$ and a data point from the second dataset $D_2$. In other words, the first node 402 may determine the data point from the second dataset $D_2$ with the lowest similarity metric a, and replace the abstain ("−1") for the data set of the first dataset $D_1$ from the first submatrix with the label or class for that data point (e.g., "−1", "0", or "1").

In some embodiments, an algorithm may find $\min(s_{r,w})$, $s_{r,w} \in S^{1,2}$ such as $\lambda_{2,t}(x^{(2,w)}) \neq -1$, $w \in [1,q]$ and assign to $g_{r,t}$ the label $\lambda_{2,t}(x^{(2,w)})$. For example, considering $g_{1,1}$, the algorithm finds the minimum $s_{1,w} \in S^{1,2}$ such as label $\lambda_{2,1}$ $(x^{(2,w)})$ is not abstain and assigns such label to $g_{1,1}$. For instance, in some examples, the smaller the similarity score is, the more similar are two points. The similarity score may be seen in this case as a distance between two data points. For each of the data point of the first node 402, the algorithm sorts in ascending order the similarity scores with the data points of the second node 404. Then, for each of the transferred function, the algorithm iterates the sorted similarity scores to find the first score that refers to a data point of the second node that has a label different from abstain.

Figure 5:
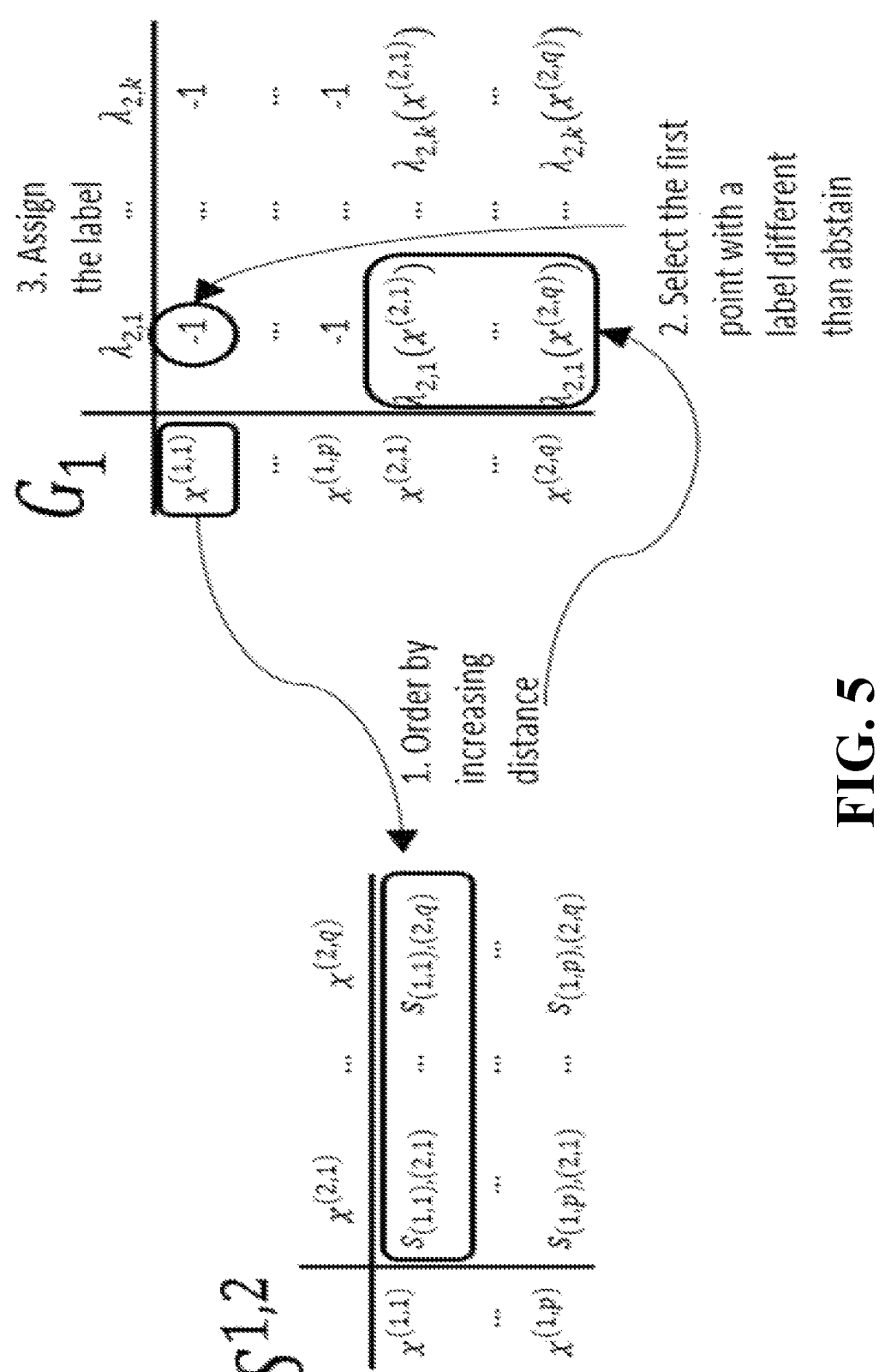
FIG. 5 illustrates a labels transfer using a most similar function according to one or more embodiments of the present invention.

In some embodiments, the first node 402 may use one or more thresholds to replace the abstains from the first submatrix with labels or classes. For instance, some embodiments may consider to use a threshold such that if the $\min(s_r, w)$ is above such threshold, no label is assigned to $g_{r,t}$ keeping it to abstain (e.g., value −1). The threshold method may be used to avoid that too many incorrect labels are assigned. The exemplary embodiment of FIG. 5 discloses a similar model using a most similar function. FIG. 5 illustrates a labels transfer using a most similar function according to one or more embodiments of the present invention. For instance, in the first step, the first computing node 402 may first order the second submatrix of the transferred labeling matrix by increasing distance, then select the first point with a label different than abstain (e.g., the first entry with a label such as "0" or "1" that is not an abstain "−1). For instance, after organizing the second submatrix by distance, at the second step, one or more of the elements or entries of the second submatrix may include abstains. The first computing node 402 may determine the first entry that is not an abstain (e.g., 0 or 1). Then, at the third step, the first computing node 402 may then assign the label of that entry to the data point from the first submatrix.

Figure 6:
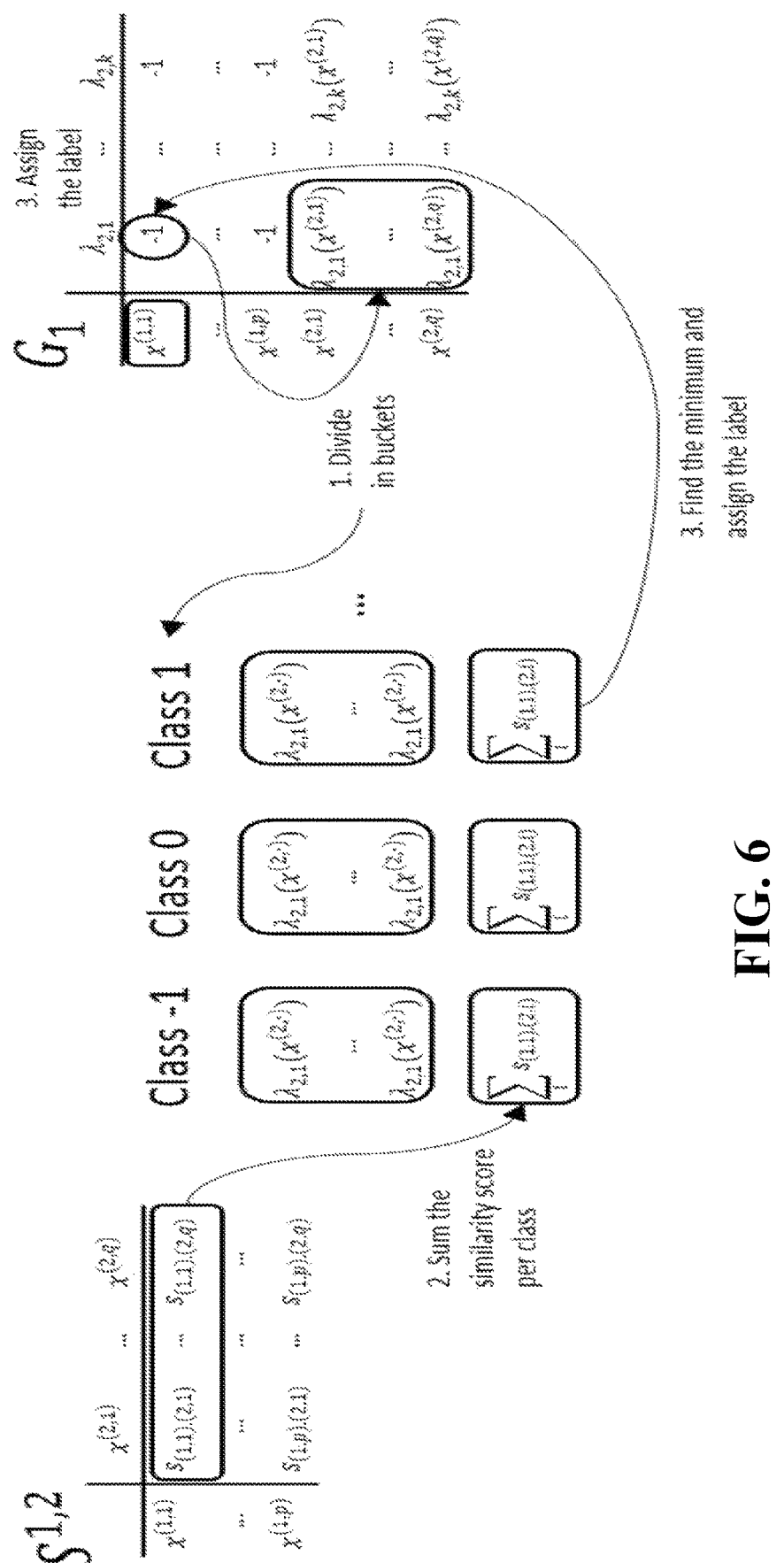
FIG. 6 illustrates a labels transfer using a minimum aggregated distance function according to one or more embodiments of the present invention.

In some embodiments, the first node 402 may use a minimum aggregated distance function for transferring labels (e.g., replacing abstains from the first submatrix with labels or classes from the second submatrix). For instance, the embodiment of FIG. 6 uses a more complex algorithm to transfer labels. In particular, FIG. 6 illustrates a labels transfer using a minimum aggregated distance function according to one or more embodiments of the present invention. For example, for a given point $g_{r,t}$, an algorithm may divide the distances $s_{r,w}$ in disjoint subsets, namely buckets, where $s_{r,w}$ of a bucket has the same label $\lambda_{2,t}(x^{(2,w)})$ of other $s_{r,w}$ in the same bucket. The algorithm then sums the values for each bucket. Finally, $g_{r,t}$ gets the label corresponding to the bucket with the lowest similarity sum. For instance, the first node 402 divides the distances in second submatrix of the transferred labeling matrix $G_1$ into buckets. The first node 402 may sum the similarity scores from the similarity matrix $S_{1,2}$ per classes. Then, the first node 402 may determine (e.g., find) the minimum among the sums of the buckets and assign the label of the minimum to the entry or element of the first submatrix.

In some embodiments, the first node 402 may normalize for each bucket the sum by the size of the bucket. In other words, for each of the summation the calculated sum is divided by the number of element of the summation. In some embodiments, the similarity sum for each subset might discard similarity score that are higher of a threshold in the computation of the sum. In some embodiments, the similarity score per bucket are summed with its inverse and the maximum is used to identify the label to be transferred. In some embodiments, label transfer computation may be applied also on the labeling matrix $L_1$ and distance matrix $S^{1,1}$.

In some embodiments, aspects of the present disclosure may apply when one or more labeling functions are shared between analytics nodes (e.g., the first node 402 and the second node 404). In such cases, when the label transfer method is applied to the shared labeling function column, it considers also the noisy labels computed on the $D_1$. For this operation, the first node 402 computes similarity matrix $S^{1,1}$ beforehand. The label transfer method may then assign a label to data points with no label by using an algorithm such as, but not limited to, the minimum similarity algorithm or minimum aggregated similarity algorithm. The algorithm considers (e.g., determines) the similarities of the data point of the first node 402 under analysis with the data points of the second node 404 as well with other data points of the first node 402.

Figure 7:
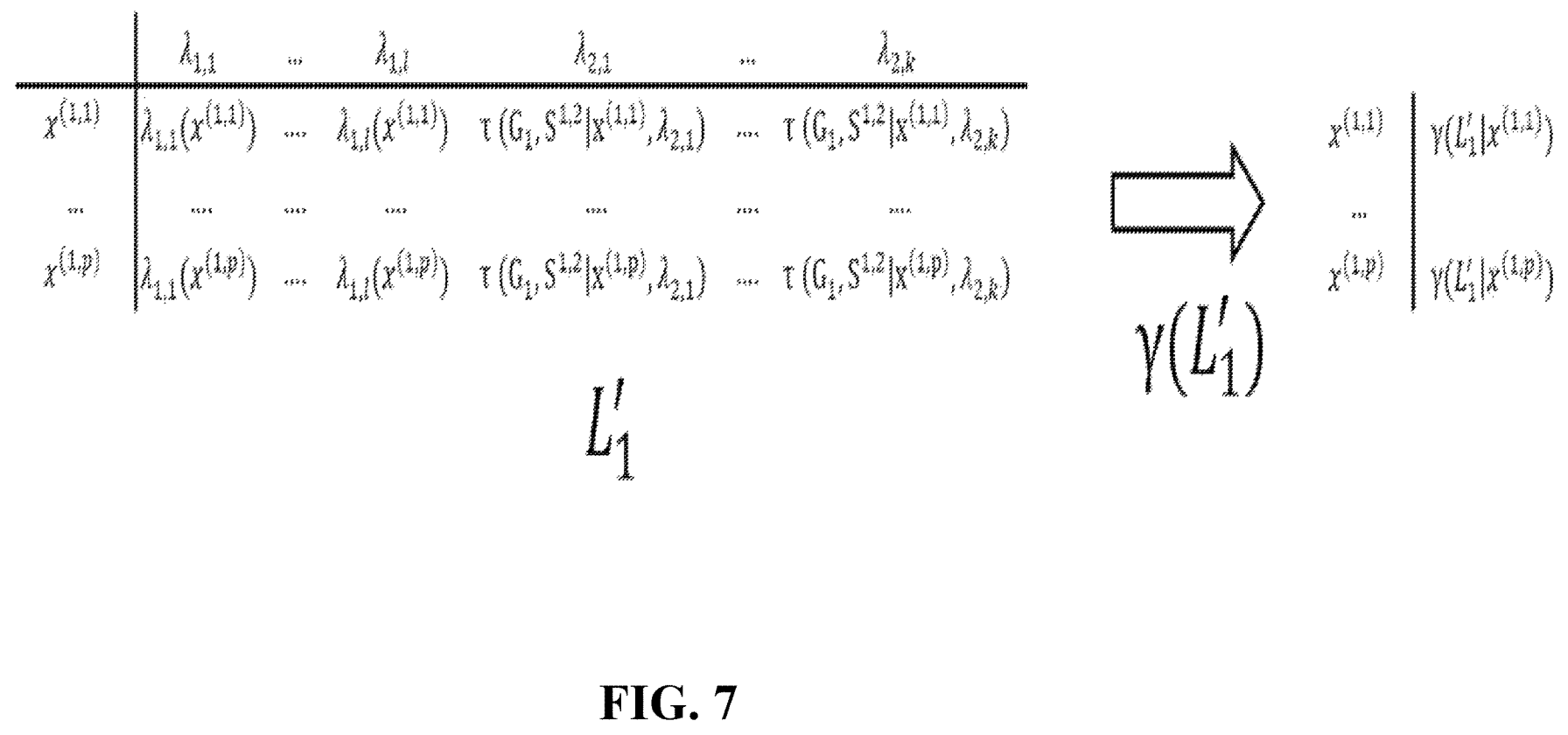

Labels aggregation 418 may be performed. In particular, at the end of the previous step, the first node 402 determines a matrix $L'_1$ composed by the labels matrix 416 produced by the labeling functions applier 410 and the labels transfer 428. FIG. 7 will describe the matrix $L'_1$ in more detail. In other words, the first node 402 generates the matrix $L'_1$ based on replacing one or more of the abstains from the first submatrix with classes or labels from the second submatrix associated with the labeling matrix of the second node 404. Afterwards, a label aggregator 418 processes this matrix L'$_1$ to compute probabilistic labels, one per data point. In particular, labels aggregation 418 applies function $$\gamma(L_1').$$

This function can be a simple majority voter that for each row for matrix $$L_1'$$

decides for the label different than abstains that appears more frequently. In other words, the first node 402 uses labels aggregation 418 to process (e.g., determine) a single label or an abstain for each data point. The first node 402 applies a function $\gamma$ to this matrix $$L_1'$$

to determine the single label or abstain for each data point. In some instances, the function $\gamma$ may be a simple majority voter function, and the first node 402 may use the simple majority voter function to determine the single label or abstain (e.g., determining which class, label, or abstain is the majority for each of the data points).

In some embodiments, this function is a generative model that is trained to learn from the accordance or discordance among the labels. In some embodiments, a majority voter approach may be used. This method considers the labels for each data point as a vote and select the label with most votes. Another approach is to consider the true class as a latent variable in a probabilistic model. The generative model may identify correlation among labeling functions and differently weight the votes depending on their correlation by minimizing the negative log marginal likelihood.

The output of the function $$\gamma(L_1')$$

may still be a label or an abstain. The latter (e.g., abstain) may happen in the majority voter case because there is the same amount of appearance of more than one non-abstain labels in a row. In the generative model implementation, this may happen when the confidence of the generative model is too low for a label.

FIG. 7 illustrates an exemplary labels aggregation according to one or more embodiments of the present invention. In particular, FIG. 7 provides an exemplary illustration of the matrix L'$_1$ and the output of $$\gamma(L_1').$$

For instance, the rows of the matrix L'$_1$ are the data points of the first dataset. The columns of this matrix include the first labeling matrix determined by the applying the first set of labeling functions to the first dataset as well as the first submatrix of the transferred labeling matrix G$_1$ after performing labels transfer (e.g., replacing one or more of the abstains of the first submatrix with labels/classes from the second submatrix). Then, the first node 402 may compute a single label or abstain based on the matrix L'$_1$ using the generative model and/or the majority voter.

A labels array 420 may be generated based on the labels aggregation 418. Labels dataset filtering 422, discriminative model training 426, and model operation may be performed. For instance, from the array of single generated labels (e.g., the computed single label or abstain for each of the data points from the first dataset) 420, a function is selecting (e.g., filtering) 422 only the non-abstains labels and associating them with the features of the data points of the dataset. This filtered dataset (e.g., the training dataset 424) with the generated labels is, then, used to train a discriminative model 426. Different embodiments may use a different discriminative model 426, for example a random forest, a multi-layer perceptron, or a naïve Bayes network.

In other words, the first node 402 filters 422 the output from the matrix L'$_1$ using the generative model and/or the majority voter such that abstains are filtered out and only the labels or classes remain. Then, the first node 402 uses the labels or classes along with their respective data points from the first dataset to train a discriminative model 426 such as a machine learning model and/or a neural network. The discriminative model may include, but are not limited to, a random forest, a multi-layer perceptron, and/or a naïve Bayes network.

After training the model, the trained model is then used to classify unseen data points (e.g., new data points).

In some embodiments, the resulting weights of the model may be shared to a global analytics node that can aggregated them with model weights computed by other analytics node. In other words, after training the model by the first node 402, the first node 402 may determine resulting weights for the model. Then, referring back to FIGS. 1 and 2, the first node 402 may share the model with a computing system 106 (e.g., the global analytics node). The computing system 106 may aggregate the model weights from multiple local nodes such as the first node 402 and/or the second node 404 to determine a global weight for the ML model.

Figure 8:
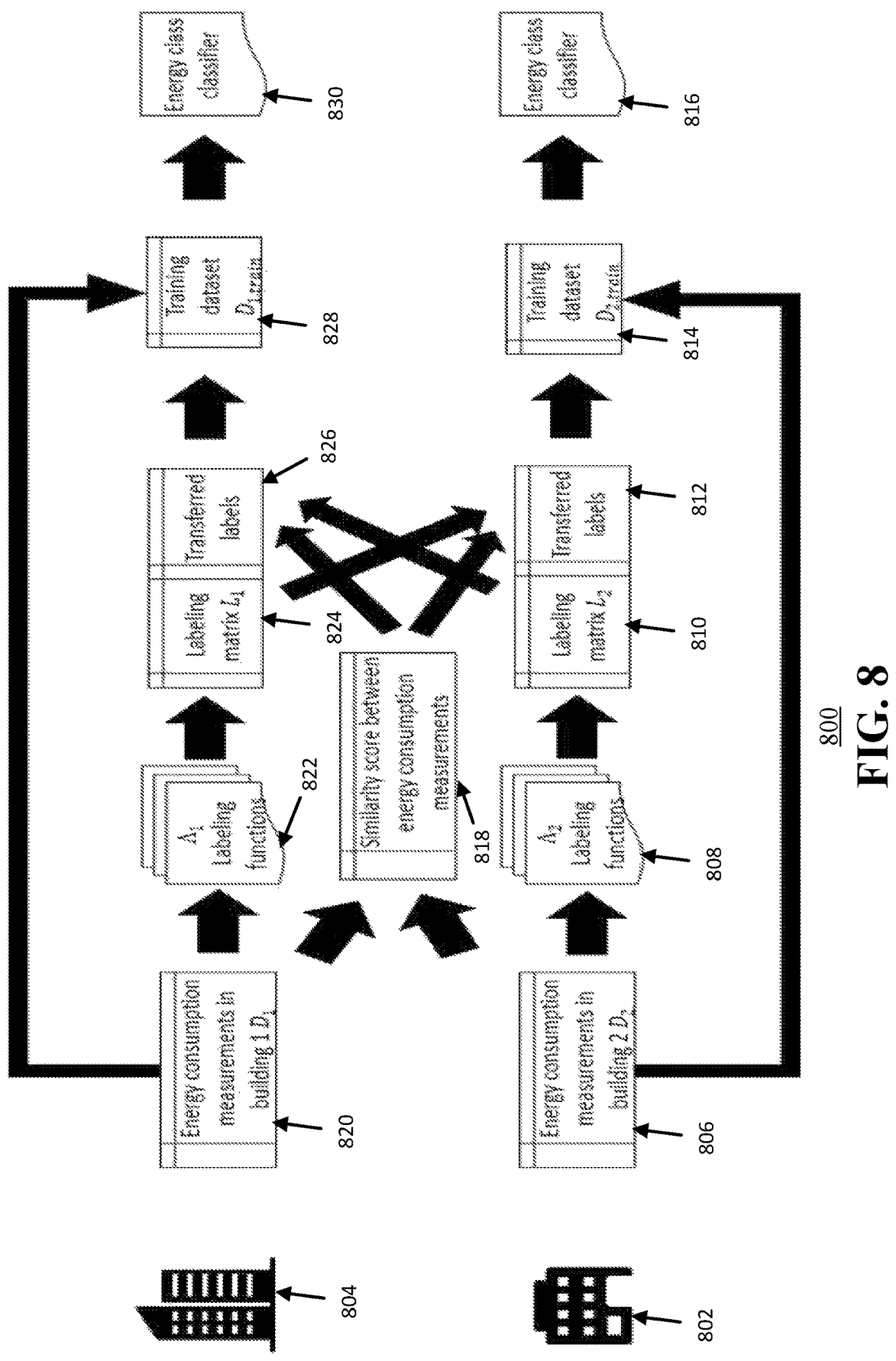
FIG. 8 schematically illustrates an exemplary embodiment of the present invention of a green twin application for smart building according to one or more embodiments of the present invention.

FIG. 8 discloses an exemplary embodiment of the present disclosure with a green twin application for smart buildings. Energy sustainability is nowadays a very relevant topic. Internet of things (IoT) and digital twin together are seen as the way to address this urgent challenge.

Analyzing the energy expenditure of a building is not a trivial task. The categorization of buildings into energy classes depending on their environment impact is important to plan maintenance, renovation or rebuilding. However, information gathered into private buildings may be privacy relevant, and, thus, not suitable to be shared. In addition, manually annotating a dataset is not trivial and it may be very expensive. Implementing heuristics or simulation models to annotate the data might also be expensive. Thus, such ML models might not be shared among the different administrators of the buildings. In this case, the present invention may be used to minimize the costs of dataset annotation by foreseeing cooperation among buildings without sharing any assets (e.g., labeling functions and data points).

In some embodiments of the green twin (e.g., the system 800), the information gathered into each building (e.g., buildings 802 and 804) are: indoor environment information (e.g., indoor temperature, $CO_2$, humidity), outdoor environment information (e.g., outdoor temperature, rainfall, luminosity), and building activities (e.g., scheduled meetings, crowd estimation, office hours). For instance, the first node 802 and the second node 804 may gather information (e.g., energy consumption measurements in the first and second buildings 806, 820) such as, but not limited to, indoor environment information, outdoor environment information, and/or building activities. The second node 804 may gather information associated with their building (e.g., energy consumption measurements in the second building 820), determine and/or provide a labeling matrix 824. For instance, the second node 804 may apply labeling functions 822 to their data points (e.g., gathered information 820) to determine a labeling matrix 824. Furthermore, a third node (e.g., a separate node or computing system) may determine a similarity matrix and/or similarity metrics (e.g., similarity scores between energy consumption measurements 818). The first node may determine a labeling matrix 810 based on the labeling functions 808 and their data points (e.g., energy consumption measurements in the first building 806). The first node 802 may receive the labeling matrix 824 (e.g., the transferred labels 812) from the second node 804 as well as the similarity matrix/similarity metrics 818. Similarly, the second node 804 may receive the labeling matrix 810 (e.g., the transferred labels 826) as well as the similarity matrix/similarity metrics 818. The first node 802 may compute a matrix $L'_1$ based on the similarity matrix and/or the labeling matrix from the second node. After, the first node may perform labels aggregation and determine labels for the data points based on the matrix $L'_1$ and use the labels/data points (e.g., the training dataset 814) to train an ML model/discriminative model (e.g., an ML model for energy class classifiers 816). Similarly, the second node 804 may perform similar operations as the first node 802 to determine a training data 828 and train an ML model/discriminative model (e.g., an ML model for energy class classifiers 830). In some embodiments, the trained model (e.g., the discriminative model and/or ML model) may identify the energy consumption class of the building. In some embodiments, the trained model may calculate the foreseen amount of energy consumption.

Another exemplary embodiment includes applications to industrial IoT. Artificial Intelligence (AI) models applied on sensors measurements can be used for predictive maintenance of machinery. Machines deployed into factories are connected to cloud systems for monitoring their behaviors.

Automotive manufactures have assembly lines similar to each. In addition, the IoT-based monitoring systems are usually similar to each. Deep learning and data mining methods processing IoT data can be used to identify issues such as hidden problems in the assembly line. Building knowledge while mining only from a single factory might not be feasible and data from multiple factories may be used. However, this may cause severe industrial data leakage.

For this purpose, federated learning can be applied to train models locally at the factory and share only the model weights. However, the data should be labeled first. The labeling process might be done either manually or through labeling functions. In the first case, the labeling can be very expensive since a domain expert needs to spend large amounts of time for this task. Another approach is the application of labeling functions. The functions might be implemented by a domain expert of each factory deployment. These noisy labels must be abundant and redundant in order to have a first model convergence locally. If the convergence is not reached locally this might hamper the global convergence.

Sharing the labeling functions might also be unwanted by the factories since it embeds knowledge in the assembly lines of the factory. Embodiments of the present disclosure allow the factories to keep secret their data and allows a convergence of models even without sharing the labeling functions. The labels transfer ensures a bigger coverage of labeling and, thus, a bigger filtered dataset.

In some embodiments of industrial IoT, each of the machines collects the electricity consumption data recorded by the electricity meter. The task for the model is to identify power consumption anomaly that may be dangerous for the machines and for the plant. As such, a second node may gather information associated with their factory (e.g., electricity consumption data recorded by the electricity meter), determine and/or provide a labeling matrix. Furthermore, a third node (e.g., a separate node or computing system) may determine a similarity matrix and/or similarity metrics. The first node may receive the labeling matrix from the second node as well as the similarity matrix/similarity metrics. The first node may compute a matrix $L'_1$ based on the similarity matrix and/or the labeling matrix from the second node. After, the first node may perform labels aggregation and determine labels for the data points (e.g., the data points associated with the first node's electricity consumption data) based on the matrix $L'_1$ and use the labels/data points to train an ML model/discriminative model. The ML model may be used to identify/indicate power consumption anomalies (e.g., when the power consumption may indicate danger for the machines and/or for the plant).

In some embodiments, the task may be to predict air-conditioning failure among air-conditioning systems based on the data collected (e.g., data points) such as: evaporator inlet and outlet water temperature, condenser inlet and outlet water temperature, compressor inlet and outlet air temperature, evaporator cooling capacity, evaporator inlet air pressure, condenser outlet air pressure, exhaust air overheat temperature, main circuit's coolant level, opening size of the main coolant pipe valve, compressor's load, compressor's current, compressor's rotational speed, compressor's voltage, compressor's power, and compressor's inverter's temperature. To put it another way, based on the data points above, the first node may determine and train an ML model to predict air-conditioning failure among air-conditioning systems.

In some instances, exemplary embodiments of the present disclosure may perform one or more of the following steps and/or have the following advantages:

1) To avoid sharing data between non-trusted nodes into federation, a component computes only a similarity score between data points of two different datasets in a privacy-preserving similarity manner; and/or 2) Transferring the computed labels from a second node with a second set of labeling functions applied to the dataset owned by the second node to data points of a dataset owned by a first node by analyzing the similarity scores of data points of the two different datasets.

In some examples, one or more exemplary embodiments of the present disclosure provides a method for federated learning systems to transfer labels on dataset managed by different analytics nodes without sharing data samples or labeling functions. The method comprises:

1) One or more analytics nodes in the federation collects data points through its owned sensors;

2) One or more analytics nodes compute locally a labeling matrix by applying its own set of labeling functions on the data points of its own dataset;

3) One or more analytics nodes sends its dataset following an agreed privacy-preserving protocol to a logically independent node and its labeling matrix to the other analytics nodes;

4) The logically independent node computes a privacy-preserving similarity score between data points of the dataset of a first analytics node and the data points of the dataset of a second analytics node. Every analytics node receives the computed similarity matrix;

5) One or more analytics nodes transfer the labels computed by other analytics node with their respective set of labeling functions applied on their respective owned data points by analyzing the similarity scores computed at point 4);

6) One or more analytics nodes aggregates the labels computed at point 2) and at point 5) into an array composed of one label per each data point of the dataset of the first analytics node, filters out the abstains label from the said array, and associates the data points to the remaining label. This operation results with a labelled dataset per analytics node;

7) One or more analytics nodes aggregates trains a discriminative model with the resulting dataset from point 6) and use the trained model for local classification; and/or 8) Optionally, a global node aggregates the local models into a global model using state of the art federated learning techniques.

Exemplary embodiments of the present disclosure, in contrast to existing technology, provides for many improvements, such as:

Analytics nodes might not share any data point between them. Additionally, and/or alternatively, the analytics nodes might not share any labeling functions among them.

Compared with federated learning that share the weights of the model, embodiments of the present disclosure may iterate to reach a convergence of model.

In addition, embodiments of the present disclosure may target to have a convergence of the model trained locally at an analytics node, without the needs to label manually data points or to write too many labeling functions.

Embodiments of the present disclosure can rely on the privacy-preserving computation of the similarity score.

As such, embodiments according to the present invention provide improvements in the art of specialty machine learning computers. In particular, as explained above, embodiments of the present invention provide an improved machine learning computer that is enabled to execute federated machine learning with enhanced privacy and with efficient use of compute resources, while also expanding available data sets within the federated system and improving local convergence at the ML model. For instance, the data points and the labeling functions may include sensitive data. As such, the present invention may enhance privacy by preventing the sharing of this sensitive data such as by obfuscating the data points sent to the third node, sharing only the labels for the data points rather than sharing the actual data points and/or the labeling functions, using a feature extraction process, and/or other methods to enhance privacy (e.g., by using a trusted third party). Furthermore, the present invention may provide a more efficient system for training machine learning models with unlabeled datasets, especially when encountering noisy labels. For instance, by exploiting the similarities of data points between the nodes, the present invention allows local convergence at the nodes of a federated learning system even without sharing any of the original data points between the nodes.

Embodiments of the present disclosure may have additional applications beyond those specifically discussed in the specification. For example, embodiments of the present disclosure may also improve or enhance existing products. Moreover, embodiments may be exploited in scenarios of healthcare, industrial IoT, and/or sustainable energy.

Exemplary embodiments of the present disclosure present a shared protocol among parties. Therefore, the interface and the data exchanged may be observable when assessing the embodiments and functionalities.

In some examples, the present invention includes methods and systems to transfer labels between analytics nodes of a federated learning system. For instance, the federated learning system includes a plurality of computing entities (e.g., systems, user interfaces, computing apparatus, devices, servers, special-purpose computers, node, smartphones, tablets or computers configured to perform functions specified herein) comprising one or more processors and memory. The processors can include one or more distinct processors, each having one or more cores, and access to memory. Each of the distinct processors can have the same or different structure. The processors can include one or more central processing units (CPUs), one or more graphics processing units (GPUs), circuitry (e.g., application specific integrated circuits (ASICs)), digital signal processors (DSPs), and the like.

In some examples, the federated learning system includes a separate node (e.g., a separate computing entity such as a third computing entity) and a plurality of analytics nodes (e.g., a plurality of analytics computing entities such as the first node and the second node described above). The computing entities within the federated learning system may communicate with each other via a network. The network may be a global area network (GAN) such as the Internet, a wide area network (WAN), a local area network (LAN), or any other type of network or combination of networks. The network may provide a wireline, wireless, or a combination of wireline and wireless communication between the computing entities within the federated learning system. For instance, the federated learning system may include two analytics nodes (e.g., a first node and a second node) and a separate computing node (e.g., a third node). The two analytics nodes and the separate computing node may communicate with each other via the network.

FIG. 9 shows a process for transferring labels between nodes of a federated learning system according to one or more embodiments of the present invention. The descriptions, illustrations, and processes of FIG. 9 are merely exemplary and the process 900 may use other descriptions, illustrations, and processes for transferring labels between nodes of a federated learning system.

In operation, at block 902, a first computing entity (e.g., an analytic node) in a federated learning system determines a first labeling matrix based on applying a first set of labeling functions to first data points. The first labeling matrix comprises a plurality of first labels. For instance, initially, the analytics nodes (e.g., a first and a second computing entity) may collect data points through sensors associated with an environment (e.g., a smart building or industrial facility). For instance, the first and the second analytics nodes (e.g., first and second computing entities) may be part of and/or include a plurality of sensors configured to detect, monitor, and/or obtain sensor information (e.g., information indicating data points).

The analytics nodes may locally compute labeling matrices (e.g., the first and second labeling matrix) by applying its own set of labeling functions on the data points of its dataset. For instance, each analytics node includes a set of labeling functions, and applies the labeling functions to their own dataset (e.g., to their own data points) to determine a labeling matrix. The labeling matrix indicates a class/label or an abstain (e.g., "−1") for each of the entries. For instance, in a binary classification, the analytics node may indicate a "0", a "1", or a "−1" based on applying the labeling functions to their own dataset.

At block 904, the first computing entity obtains a similarity matrix indicating similarity scores between the first data points and the second data points associated with a second computing entity (e.g., a second analytics node). For example, in some embodiments, without providing the actual labeling functions and/or the actual data points, the analytics nodes (e.g., first and second computing entities) may provide the labeling functions and/or obfuscated data points to other entities of the federated learning system. For instance, the second node may provide its labelling matrix (e.g., the second labelling matrix) to the first node. The second node and the first node may further provide their data points (e.g., obfuscated data points) to a third node (e.g., a separate computing entity). For instance, the federated learning system may have an agreed upon protocol (e.g., a privacy-preserving protocol). The protocol may include, but are not limited to, altering/encrypting the data points of the analytics nodes, a feature extraction process, and/or using their own original data based on the third node being a trusted third party. The analytics nodes may agree upon the node prior to being allowed to join the federated learning system.

The third node (e.g., the third computing entity) may receive the obfuscated and/or original data points from the analytics nodes (e.g., the first and second nodes) and may compute a privacy-preserving similarity matrix/similarity score between the data points for the analytics nodes. For instance, the third node may compare the data points between the first and second nodes to determine a similarity score for each comparison. The third node may generate a similarity matrix based on the similarity scores. The third node may then send the similarity matrix to the analytics nodes such as the first and/or the second nodes.

At block 906, the first computing entity augments the first labeling matrix with labels from a second labeling matrix based on the similarity scores between the first data points and the second data points. The second labeling matrix is received by the first computing entity from the second computing entity and is based on applying a second set of labeling functions to the second data points. For example, the analytics nodes may receive the similarity matrix and the labeling matrix (e.g., the second labeling matrix), and generate a transferred labeling matrix. For instance, the transferred labeling matrix may include two submatrices. The first submatrix may initially indicate abstain values for the data points associated with the first node (e.g., the data points collected from the first environment such as a first industrial facility). Furthermore, the columns of the first submatrix may indicate the labeling functions for the second node. In other words, the elements of the first submatrix indicate abstains initially as the labeling functions for the second node (e.g., the second labeling functions) have not been applied to the first data points of the first node. The second submatrix indicate classes or abstains associated with applying the second labeling functions to the second data points associated with the second node (e.g., data points collected from the second environment).

Then, the analytics nodes may use the similarity score and the second submatrix to replace the abstains from the first submatrix with classifications (e.g., classes, labels, and/or abstains) from the second submatrix. For instance, based on the similarity score (e.g., the lowest similarity score, minimum distance, and so on), the analytics node may replace one or more abstains from the first submatrix with classes/labels/abstains from the second submatrix.

The analytics nodes may then compute an altered or an addendum labeling matrix (e.g., $L_1'$). The altered or addendum labeling matrix may be the augmented first labeling matrix. For instance, the first node may generate an augmented labeling matrix. The rows of the augmented labeling matrix may indicate the first data points. The columns of the augmented labeling matrix may indicate the first set of labeling functions (e.g., the original set of labeling functions for the first node) and the second set of labeling functions associated with the second node. The entries for the first set of labeling functions may be based on applying the first applying functions to the first data set. The entries for the second set of labeling functions may be based on using the similarity score and the second submatrix of the transferred labeling matrix.

At block 908, the first computing entity reduces the first augmented labeling matrix into an array comprising a single label for each of the first data points and filters the array based on removing abstains from the array. For instance, the analytics node may then aggregate the labels (e.g., class and/or abstain) and compute an array for each data point from the first dataset. For instance, the analytics node may use majority voter and/or a generative model on the addendum labeling matrix to determine a label for each of the first data points. The label may be a class (e.g., "0" or "1") or an abstain. The analytics node may filter out the abstains from the array and associate the data points to the remaining labels. This results in a labeled dataset per analytics node.

At block 910, the first computing entity trains a discriminative machine learning (ML) model associated with the first computing entity based on the filtered dataset and/or the array. For instance, the analytics node may then train a discriminative model (e.g., ML model) with the resulting dataset and use the trained model for local classification. Additionally, and/or alternatively, the analytics node may provide information associated with the trained discriminative model (e.g., the ML weights) to the third node. The third node may aggregate the local models into a global model (e.g., determine global ML weights for the ML model based on the local ML weights determined by the analytics nodes).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for privacy preserving machine learning in a federated learning system, the method comprising:

determining, by a first computing entity in the federated learning system, a first labeling matrix based on applying a first set of labeling functions to first data points, the first labeling matrix comprising a plurality of first labels, each of the plurality of first labels is associated with a data point from the first data points and a labeling function from the first set of labeling functions;

obtaining, by the first computing entity, a similarity matrix indicating similarity scores between the first data points and second data points associated with a second computing entity, wherein the similarity matrix is obtained from a third computing entity that is separate from the first computing entity and the second computing entity, wherein the similarity matrix indicates the similarity scores based on first obfuscated data from the first computing entity and second obfuscated data from the second computing entity, and wherein the first obfuscated data is associated with the first data points and the second obfuscated data is associated with the second data points;

augmenting, by the first computing entity, the first labeling matrix to generate a first augmented labeling matrix by transferring labels from a second labeling matrix into the first labeling matrix using the similarity scores between the first data points and the second data points, the second labeling matrix is received from the second computing entity and is based on applying a second set of labeling functions to the second data points, the first augmented labeling matrix having a first dimension associated with the first data points and a second dimension associated with the first set of labeling functions and the second set of labeling functions; and training, by the first computing entity, a discriminative machine learning (ML) model associated with the first computing entity based on the first augmented labeling matrix.

2. The method according to claim 1, the method further comprising:

providing, by the first computing entity and to the third computing entity, the first obfuscated data associated with the first data points.

3. The method according to claim 2, wherein providing the first obfuscated data to the third computing entity comprises executing a privacy-preserving protocol, wherein the privacy-preserving protocol alters or encrypts the first data points prior to providing the altered or encrypted first data points to the third computing entity as the first obfuscated data.

4. The method according to claim 2, wherein providing the first obfuscated data to the third computing entity comprises executing a privacy-preserving protocol, wherein the privacy-preserving protocol comprises executing a feature extraction protocol based on the first data points to generate the first obfuscated data.

5. The method according to claim 2, the method further comprising:

providing, by the first computing entity and to the third computing entity, first model weights obtained from the trained discriminative ML model of the first computing entity; and receiving, from the third computing entity, a global ML model for the federated learning system that is determined based on the first model weights of the first computing entity and second model weights obtained from a second trained discriminative ML model associated with the second computing entity.

6. The method according to claim 1, the method further comprises:

prior to determining the first labeling matrix, obtaining, by the first computing entity of the federated learning system, the first data points using one or more sensors locally associated with the first computing entity.

7. The method according to claim 1, wherein the first set of labeling functions is different from the second set of labeling functions, and wherein the first data points are different from the second data points.

8. The method according to claim 1, the method further comprising:

determining a transferred labeling matrix comprising a first submatrix indicating abstains associated with the first data points and a second submatrix indicating classifications associated with the second data points of the second computing entity; and replacing the abstains of the first submatrix with classifications of the second submatrix based on the similarity matrix indicating the similarity scores, wherein augmenting the first labeling matrix is based on the transferred labeling matrix with the abstains replaced with the classifications from the second submatrix.

9. The method according to claim 8, wherein replacing the abstains of the first submatrix with the classifications of the second submatrix is further based on a lowest similarity score between an entry of a data point from the first submatrix and a plurality of entries from the second submatrix.

10. The method according to claim 8, wherein replacing the abstains of the first submatrix with the classifications of the second submatrix is further based on a minimum distance function and a threshold value.

11. The method according to claim 1, further comprising:

reducing the first augmented labeling matrix into an array, wherein each entry of the array indicates a single classification per data point of the first data points; and filtering the array to remove abstain classifications from the array, wherein training the discriminative ML model is based on the filtered array.

12. The method according to claim 11, wherein reducing the first augmented labeling matrix into the array is based on a majority voter function or a generative model.

13. The method of claim 1, wherein the first labeling matrix has a first dimension for the first data points and a second dimension for the first set of labeling functions, and wherein a size of the first labeling matrix is the first data points multiplied by the first set of labeling functions.

14. The method of claim 13, wherein a size of the second labeling matrix is the second data points multiplied by the second set of labeling functions.

15. The method of claim 1, wherein a size of the first augmented labeling matrix is based on multiplying the first data points by an aggregation of the first set of labeling functions and the second set of labeling functions.

16. A first computing entity of a privacy preserving federated machine learning system, the first computing entity being associated with at least one processor and being configured to:

determine a first labeling matrix based on applying a first set of labeling functions to first data points, the first labeling matrix comprising a plurality of first labels, each of the plurality of first labels is associated with a data point from the first data points and a labeling function from the first set of labeling functions;

obtain a similarity matrix indicating similarity scores between the first data points and second data points associated with a second computing entity, wherein the similarity matrix is obtained from a third computing entity that is separate from the first computing entity and the second computing entity, wherein the similarity matrix indicates the similarity scores based on first obfuscated data from the first computing entity and second obfuscated data from the second computing entity, and wherein the first obfuscated data is associated with the first data points and the second obfuscated data is associated with the second data points;

augment the first labeling matrix to generate a first augmented labeling matrix by transferring labels from a second labeling matrix into the first labeling matrix using the similarity scores between the first data points and the second data points, the second labeling matrix is received from the second computing entity and is based on applying a second set of labeling functions to the second data points, the first augmented labeling matrix having a first dimension associated with the first data points and a second dimension associated with the first set of labeling functions and the second set of labeling functions; and train a discriminative machine learning (ML) model associated with the first computing entity based on the first augmented labeling matrix.

17. A tangible, non-transitory computer-readable medium having instructions thereon which, upon being executed by one or more processors, alone or in combination, provide for execution of a method comprising:

determining a first labeling matrix based on applying a first set of labeling functions to first data points, the first labeling matrix is associated with a first computing entity in a federated learning system and comprises a plurality of first labels, each of the plurality of first labels is associated with a data point from the first data points and a labeling function from the first set of labeling functions;

obtaining a similarity matrix indicating similarity scores between the first data points and second data points associated with a second computing entity, wherein the similarity matrix is obtained from a third computing entity that is separate from the first computing entity and the second computing entity, wherein the similarity matrix indicates the similarity scores based on first obfuscated data from the first computing entity and second obfuscated data from the second computing entity, and wherein the first obfuscated data is associated with the first data points and the second obfuscated data is associated with the second data points;

augmenting the first labeling matrix to generate a first augmented labeling matrix by transferring labels from a second labeling matrix into the first labeling matrix using the similarity scores between the first data points and the second data points, the second labeling matrix is received from the second computing entity and is based on applying a second set of labeling functions to the second data points, the first augmented labeling matrix having a first dimension associated with the first data points and a second dimension associated with the first set of labeling functions and the second set of labeling functions; and training a discriminative machine learning (ML) model associated with the first computing entity based on the first augmented labeling matrix.

* * * * *